United States Patent
Imaeda et al.

[11] Patent Number: 5,473,366
[45] Date of Patent: Dec. 5, 1995

[54] TELEVISION-TELEPHONE APPARATUS HAVING A MESSAGE-KEEPING FUNCTION AND AN AUTOMATIC RESPONSE TRANSMISSION FUNCTION

[75] Inventors: Eiji Imaeda, Tokyo; Makoto Chida, Kawasaki, both of Japan

[73] Assignee: Canon Kabushiki Kaisha, Tokyo, Japan

[21] Appl. No.: 151,358

[22] Filed: Nov. 12, 1993

[30] Foreign Application Priority Data

Nov. 17, 1992 [JP] Japan .................................. 4-307116
Dec. 26, 1992 [JP] Japan .................................. 4-359536

[51] Int. Cl.[6] ........................... H04M 11/00; H04N 7/14
[52] U.S. Cl. .................... 348/14; 348/17; 348/19
[58] Field of Search ........................... 348/14, 15, 16, 348/17, 18, 19, 409, 411, 415; 379/96; 358/261.2, 261.3; H04N 7/14, 7/15

[56] References Cited

U.S. PATENT DOCUMENTS

| | | | |
|---|---|---|---|
| 4,982,285 | 1/1991 | Sugiyama | 348/415 |
| 5,046,079 | 9/1991 | Hashimoto | 348/14 |
| 5,299,019 | 3/1994 | Pack et al. | 358/261.3 |

FOREIGN PATENT DOCUMENTS

| | | | |
|---|---|---|---|
| 0196759 | 8/1991 | Japan | 379/53 |
| 0178247 | 8/1991 | Japan | 379/53 |
| 403258087 | 11/1991 | Japan | H04N 7/14 |
| 0250889 | 11/1991 | Japan | H04N 7/14 |
| 405014882 | 1/1993 | Japan | H04N 7/14 |

*Primary Examiner*—Curtis Kuntz
*Assistant Examiner*—Stella L. Woo
*Attorney, Agent, or Firm*—Fitzpatrick, Cella, Harper & Scinto

[57] ABSTRACT

A television telephone apparatus automatically commences response communication in response to a call received, so as to transmit a response message to the caller. The apparatus has a memory for storing image message and voice message transmitted from the caller. The apparatus also has an image encoding unit which forms an image frame update request signal for updating the encoding mode, and a communication control unit for transmitting the request signal to the caller. The apparatus further has an image decoding unit which determines the mode in which the received image has been encoded and, when the encoding mode of the received image has been set to a predetermined intra-frame mode after the transmission of the image frame update request signal, a received image frame memory stores the received image data for display. This arrangement ensures that a received image of good image quality can be displayed. The quality of the displayed image can further be improved when the amount of γ-correction performed at the caller side is determined in conformity with the γ characteristic of the receiving side.

17 Claims, 25 Drawing Sheets

FIG. 9(a)
FIG. 9(b)
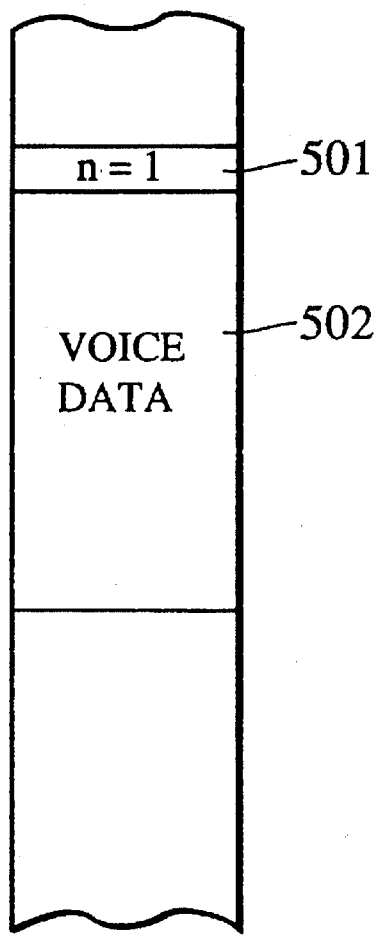
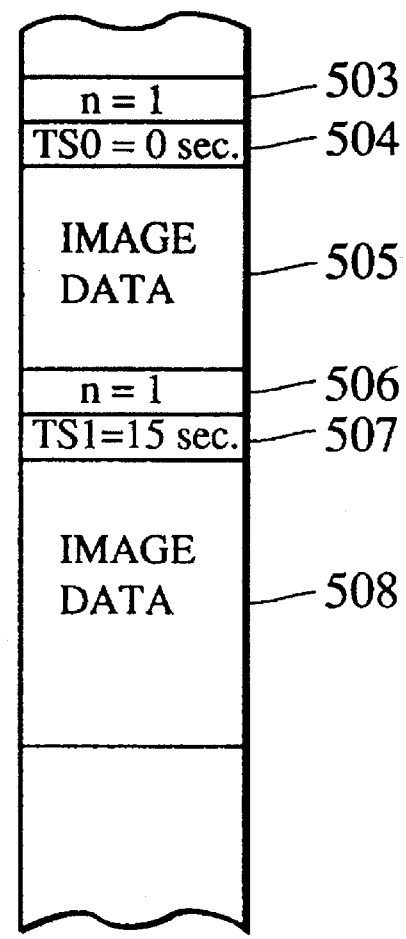

INTER FRAME

MC

INTRA FRAME

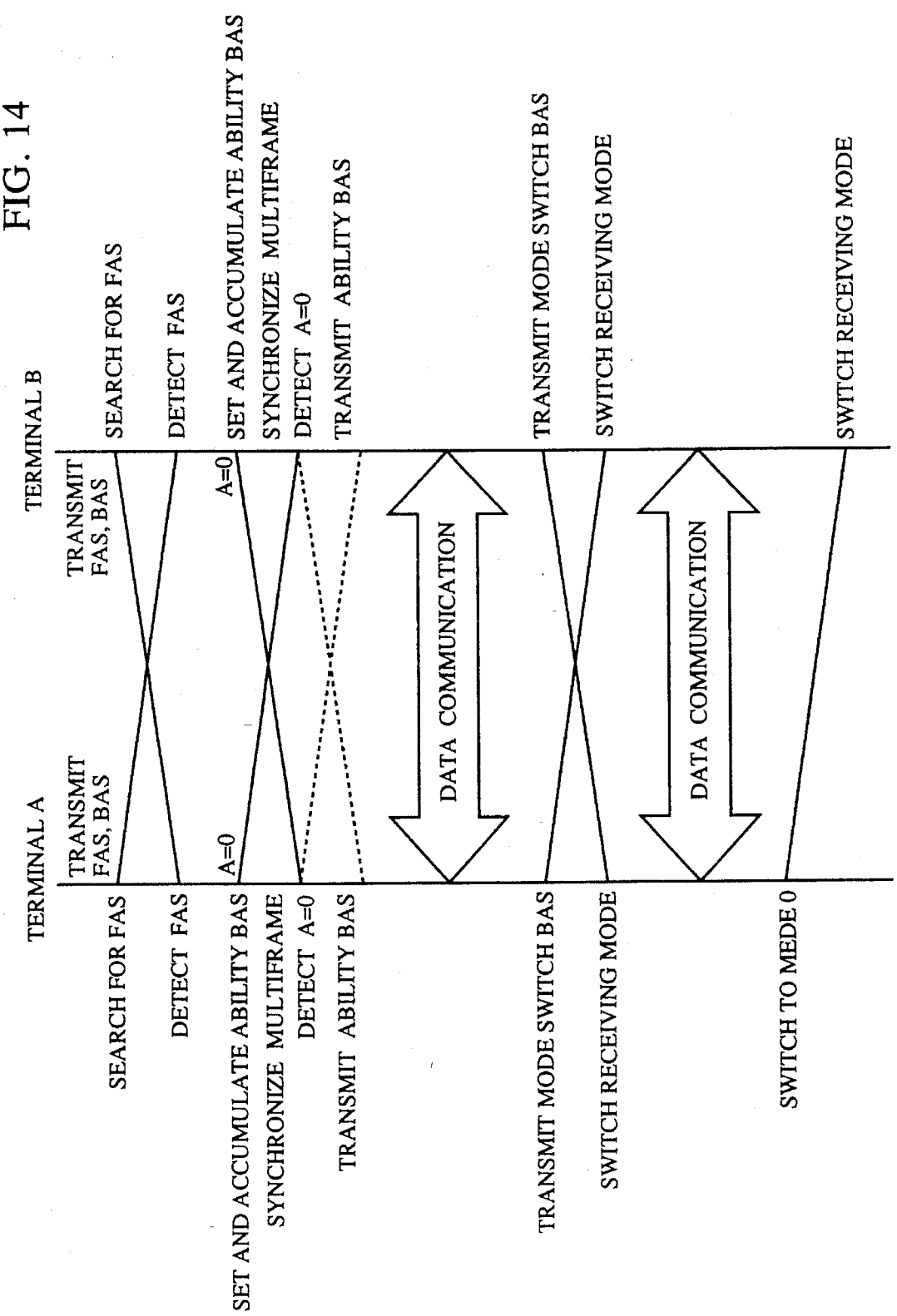

FRAME STRUCTURE

SUB-MULTIFRAME STRUCTURE

MULTIFRAME STRUCTURE

FIG. 16(a)

| FRAMES | SERVICE CHANNEL NOS. OF FRAMES | | | | | | | |
|---|---|---|---|---|---|---|---|---|
| | | 1 | 2 | 3 | 4 | 5 | 6 | 7 | 8 |
| EVEN NO. FRAME | Xeven | 0 | 0 | 1 | 1 | 0 | 1 | 1 |
| ODD NO. FRAME | Xodd | 1 | A | E | C1 | C2 | C3 | C4 |

FIG. 16(b)

| FRAME NO. | 1 | 3 | 5 | 7 | 9 | 11 | 13 | 15 |
|---|---|---|---|---|---|---|---|---|
| Xodd | N1 | N2 | N3 | N4 | N5 | R1 | R2 | TEA |

FIG. 16(c)

| FRAME NO. | 0 | 2 | 4 | 6 | 8 | 10 | 12 | 14 |
|---|---|---|---|---|---|---|---|---|
| Xeven | 0 | 0 | 1 | 0 | 1 | 1 | R3 | R4 |

FIG. 17(a)

| BIT NO. | b0 | b1 | b2 | b3 | b4 | b5 | b6 | b7 |
|---|---|---|---|---|---|---|---|---|
| CONTENT OF BAS | ATTRIBUTE ||| ATTRIBUTE VALUE ||||

FIG. 17(b)

| b0 | b1 | b2 | COMMAND OR ABILITY |
|---|---|---|---|
| 0 | 0 | 0 | VOICE ENCODING COMMAND |
| 0 | 0 | 1 | TRANSFER RATE COMMAND |
| 0 | 1 | 0 | IMAGE COMMAND AND OTHER COMMANDS |
| 0 | 1 | 1 | DATA COMMAND |
| 1 | 0 | 0 | TERMINAL ABILITY 1 |
| 1 | 0 | 1 | TERMINAL ABILITY 2 |
| 1 | 1 | 0 | UNDEFINED |
| 1 | 1 | 1 | ESCAPE CODE |

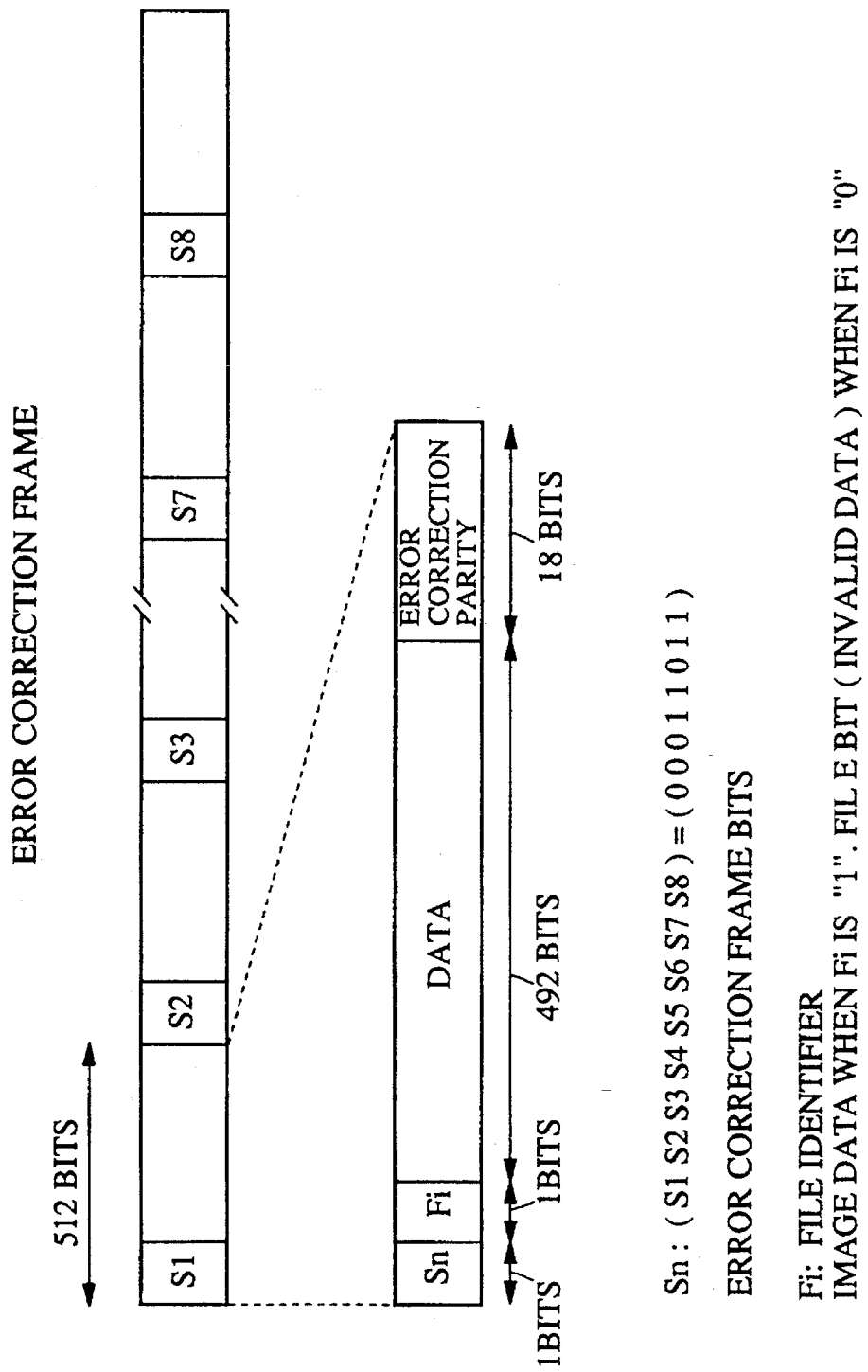

FIG. 20(a)

CIF

| 1 | 2 |
|---|---|
| 3 | 4 |
| 5 | 6 |
| 7 | 8 |
| 9 | 10 |
| 11 | 12 |

QCIF

| 1 |
|---|
| 3 |
| 5 |

FIG. 20(b)

TRANSMISSION SIDE

| IDENTIFIER | γ CORRECTION IDENTIFIER | γ CORRECTION DONE OR NOT | γ CORRECTION VALUE (UPPER LIMIT) | γ CORRECTION VALUE (LOWER LIMIT) |
|---|---|---|---|---|

RECEIVING SIDE

| IDENTIFIER | γ CORRECTION IDENTIFIER | γ CORRECTION DONE OR NOT | γ CORRECTION VALUE (UPPER LIMIT) | γ CORRECTION VALUE (LOWER LIMIT) |
|---|---|---|---|---|

TELEVISION-TELEPHONE APPARATUS HAVING A MESSAGE-KEEPING FUNCTION AND AN AUTOMATIC RESPONSE TRANSMISSION FUNCTION

BACKGROUND OF THE INVENTION

1. Field of the Invention

The present invention relates to a television-telephone apparatus capable of conducting communication both in voice and image and, more particularly, to a television-telephone apparatus having a message keeping function.

2. Description of the Related Art

In recent years, digital public communication networks, generally referred to as ISDNs (Integrated Services Digital Networks), become widespread thereby enabling simultaneous telecommunications both in image and voice. Consequently, services such as television-telephone services and television-assisted meeting systems have made forward steps towards practical use. Nowadays, various rules concerning voice/image services using digital networks, protocols and multi-media multiplex frame structures have been proposed as recommendations H.320, H.242, H.221 and so forth, by CCITT (Committee Consulting International Telegraph and Telephone).

Recommendation H.320 determines general system aspects of voice and image services, while H.221 determines encoding allocations of FAS (Frame Alignment Signal) and BAS (Bit-rate Allocation Signal) which are used in appointment of exchange and communication modes of the terminal capacity, as well as frame structure, in voice/image transmission on 64 Kbps–1,920 Kbps channel. H.242 governs the protocol for capacity exchange and communication mode change-over between terminals performed by BAS.

The recommendations also describe setting end-to-end physical connections, as well as a method for multi-communication between terminals for sending and receiving image, voice and other data in accordance with an in-channel terminal capacity exchange sequence by BAS or in accordance with mode change-over sequence under appointment of communication mode, after in-channel establishment of synchronization by FAS.

Each terminal is allowed to change its terminal capacity according to conditions, and which one of the communication modes is used within the exchanged capacity is not ruled by the recommendations.

When image information, voice information and data are transmitted simultaneously, the transmission rate of the voice information is determined by the method of encoding of the voice information, while the transmission rate of the data is set to a designated value, and the remainder of the transmission capacity of the transmission rate in the communication network is allocated to the transmission of image information.

As a method of compressing image information, the recommendation H.261 of CCITT proposes an encoding method in which intra-frame encoding and inter-compensating-frame encoding are mixed.

In an ordinary telephone system for voice communication alone, a message keeping function has been conveniently used for recording a voice message in a magnetic tape or a memory card, when a call is received during one's absence. It is desirable that a similar message keeping function is available also in an image communication system.

It would be possible to restore the compressed image and record the restored image in a video tape in an analog manner. Such a recording method, however, will require a large scale recording device and, in addition, considerably impairs the quality of the reproduced image due to degradation of image quality incurred during analog recording and reproduction. Digital recording of the restored image also is impractical because of the huge amount of data.

Alternatively, storing the received compressed image information in a large-scale storage device such as a hard disk, without restoration, has been studied. This method also is impractical because the intra-frame encoded frames and inter-frame encoded frames coexist according to the recommendation H.261 of CCITT. Namely, decoding of inter-frame encoded frames essentially requires reference to the data of the preceding frame. Mere storage of the received compressed image information in a storage device cannot provide correct image information when the latter is reproduced and displayed.

More specifically, according to the recommendation H.261 of CCITT, a television telephone apparatus of this kind employs various encoding methods according to the state of the transmitted image, such as Inter (Inter-Frames Encoding), MC (Motion Compensation Encoding) and INTRA (Intra Frame Encoding). The quality of the received images has been degraded to some extent when the encoding has been done in Inter or MC mode. Therefore, when the image received in Inter or MC mode has been stored as the received image message data, the quality of the image reproduced and displayed is undesirably impaired.

A known television telephone apparatus having a message keeping function also suffers from the following problem. The apparatus in message keeping mode records the received image data as it is, as the image message to be kept. When the time available for recording is going to expire, a warning sound or a beep is given to the caller to inform that the time available for the recording is going to expire. This warning method tends to confuse the caller, particularly when the caller is not familiar with this type of apparatus, often resulting in a misunderstanding of the meaning of the warning sound.

A known television telephone apparatus also has a responding function in which a motion picture composed of a plurality of image frames is stored as a response message image and, when a call is received during one's absence, the response message image is sent back to the caller. Such responding function requires a very large memory capacity, as well as complicated hardware structure, raising production costs.

SUMMARY OF THE INVENTION

It is therefore a principal object of the present invention to provide a television telephone apparatus which can overcome the above-described problems of the known art.

It is another object of the present invention to provide a television telephone apparatus which can store a received image in good image quality after giving a response message when a call is received during one's absence.

It is still another object of the present invention to provide a television telephone apparatus which can inform the caller of expiration of the recording time without causing confusion or misunderstanding of the caller.

It is a further object of the present invention to provide a television telephone apparatus in which a responding message image can be stored in a memory of a reduced capacity and in which the hardware structure is simplified, thus reducing the cost of production.

It is a still further object of the present invention to provide a television telephone apparatus in which a response communication is automatically started in response to a received call, so that a request signal transmitting means transmits to the caller an image frame update request signal for updating the image encoding method, and the received image is stored upon confirming that the received image has been encoded in a predetermined encoding mode, thus ensuring high quality of the record of the received image.

It is a still further object of the present invention to provide a television telephone apparatus in which a response communication is automatically started in response to a received call and in which, when a communication time administration means has determined that a predetermined time has elapsed, a transmitting means sends a predetermined image message back to the caller to inform that the recording time is going to expire.

It is a still further object of the present invention to provide a television telephone apparatus in which a response communication is automatically started in response to a received call, wherein a preset still image message which has been stored in a second memory is written by writing means into a first memory which is adapted to store, on a frame basis, image message to be transmitted, so that the still image message is sent to the caller.

It is a still further object of the present invention to provide an image receiving apparatus for use in an image communication system which transmits and receives image information after the information has been compressed using intra-frame encoding and inter-frame encoding. The apparatus includes storage means for storing compressed image data received and decoding means for decoding the compressed image data read from the storage-means and producing a restored image signal. Detecting means provided in the apparatus detects, within the compressed image data read from the storage means, a frame in which the compressed image data has been fully intra-encoded. Control means provided in the apparatus controls an output reproduced from the restored image signal in accordance with the detection output of the detecting means.

It is a still further object of the present invention to provide an image receiving apparatus for use in an image communication system which transmits and receives image information after compression using an intra-frame encoding mode and an inter-frame encoding mode. The apparatus of the present invention includes a storage means for storing received compressed image data, detecting means for detecting, within the received image data, a frame in which the compressed image data has been fully intra-encoded, and control means operative in accordance with an output of the detecting means to delete image data received earlier than the frame of the received data in which the compressed image data has been fully intra-encoded.

It is a still further object of the present invention to provide a television telephone apparatus in which any image received during one's absence is stored in compressed state, so as to provide high quality of reproduced image, as well as prolonged time of storage in the recording means.

It is a still further object of the present invention to provide a television telephone apparatus in which reproduction of a recorded image is commenced with the intra-frame encoded image, among the recorded images encoded in various modes, so that a reproduced image can be displayed without distortion from the beginning of the display.

It is a still further object of the present invention to provide a television telephone apparatus in which γ correction in conformity with the γ characteristic of the image display device of the receiving end can be done at the image transmitting end, i.e., at the caller's side, thereby improving color reproducibility and image quality.

These and other objects, features and advantages of the present invention will become clear from the following description of the preferred embodiments when the same is read in conjunction with the accompanying drawings.

BRIEF DESCRIPTION OF THE DRAWINGS

FIGS. 9(a) and 9(b) illustrate the data storage status of the memory during the reproduction of a recorded message.

FIG. 14 illustrates the in-channel control procedure.

FIGS. 16(a) to 16(c) illustrate the FAS bit structure.

FIGS. 17(a) and 17(c) illustrate the BAS bit structure.

FIG. 18 illustrates the structure of BCH error correction frames.

Figures 20A, 20B:
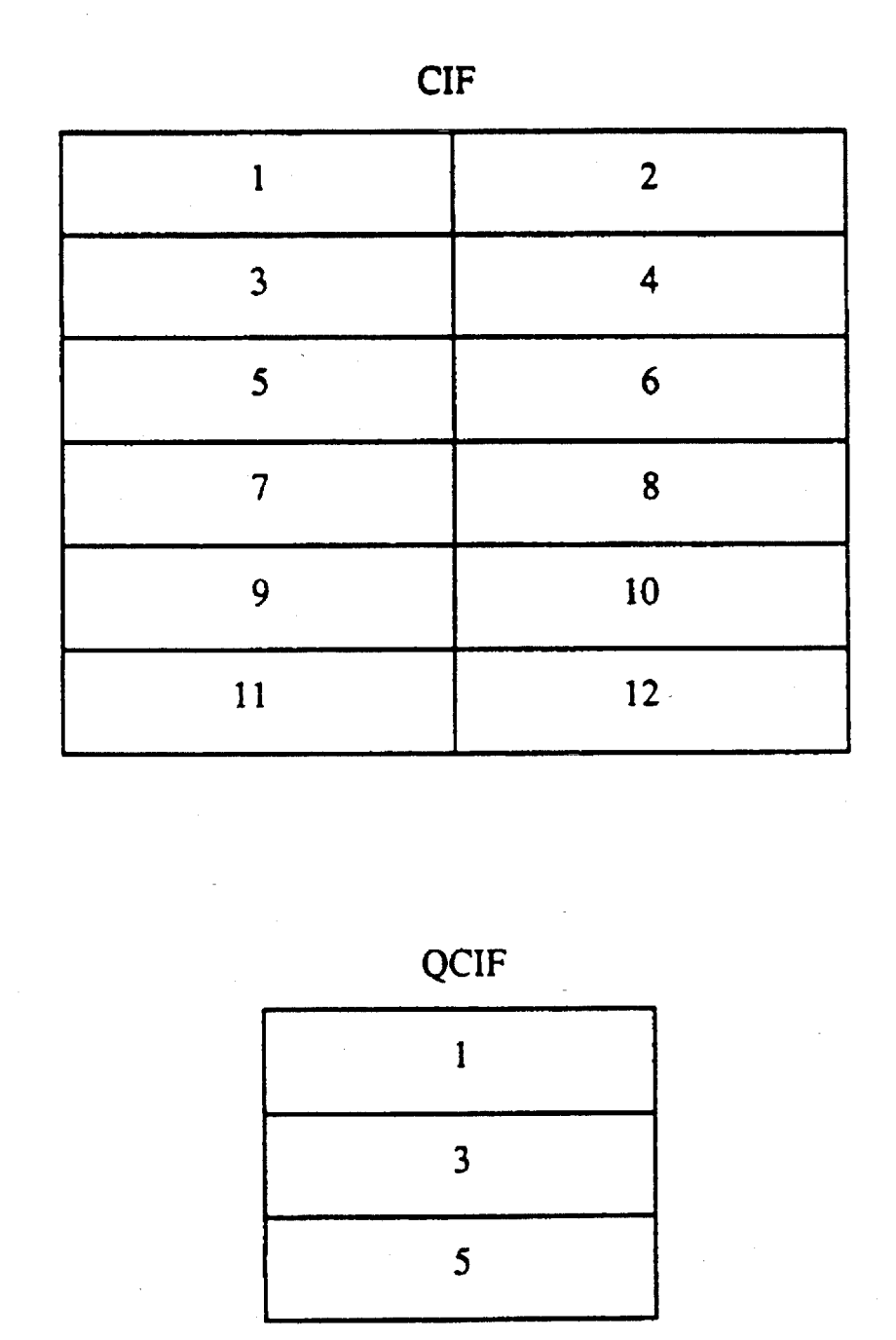

FIG. 20 illustrates the CIF and QCIF image formats.

DETAILED DESCRIPTION OF THE PREFERRED EMBODIMENTS

The preferred embodiments of the present invention will be described in detail hereinafter with reference to the drawings.

First Embodiment

[Construction]

Figure 2:
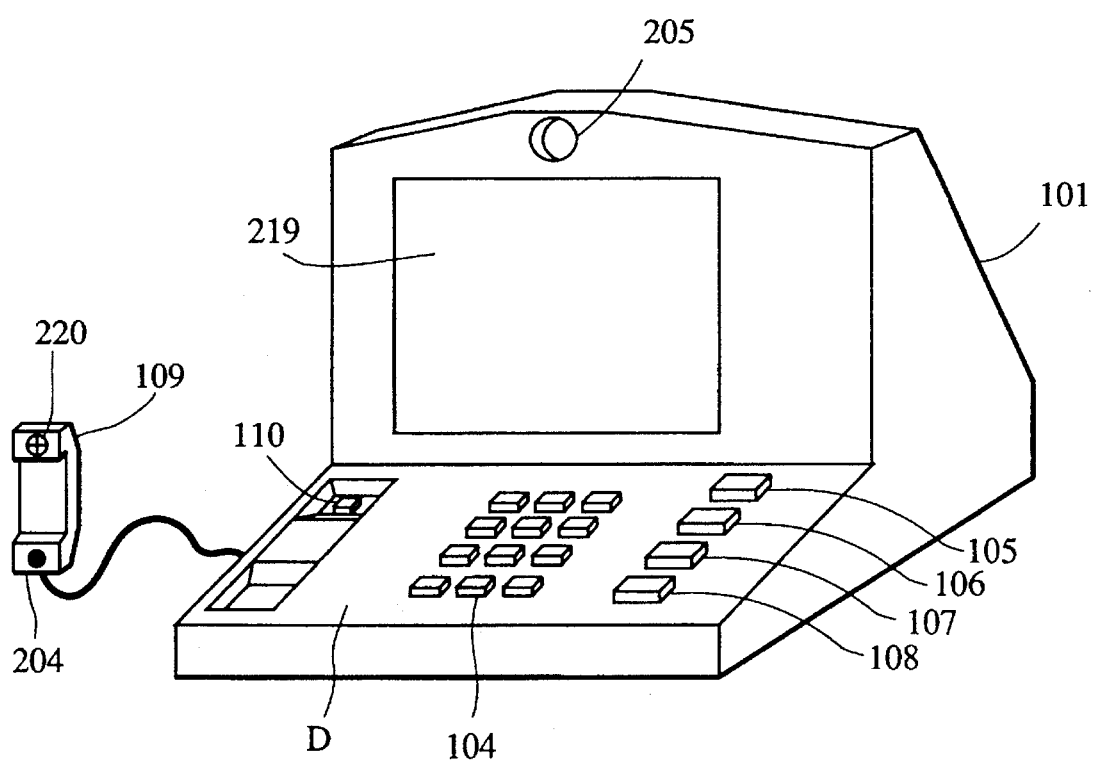
FIG. 2 is a perspective view of the exterior of the first embodiment illustrated in FIG. 1.

Referring to FIG. 2, a first embodiment of the invention comprises a TV telephone main body 101 and a handset 109. The TV telephone main body 101 comprises: a display 219 for displaying received images and the like; a camera 205 for taking pictures of a user and the like; and an operating board D protruding from a portion below the display 219. The operating board D has pushbutton digits 104 arranged in a central portion thereof. Near the right-hand (in the figure) side of the operating board D, there are arranged: a message keeping mode setting button 105 for setting the message keeping mode; a play-back button 106 for reproducing a message or the like which has been automatically received in the message keeping mode; a storing button 107 for storing an answer message which is used in the message keeping mode; and a freeze button 108 for freezing an image. The handset 109, comprising a speaker 220 and a microphone 204, is connected to a left-hand (in the figure) side portion of the operating board D. Near the left-hand side thereof, there is provided a hook-switch 110 onto which the handset 109 is placed while the TV telephone apparatus is left idle. When the handset 109 is picked up, the hook-switch 110 comes into the off-hook status. When the handset 109 is placed on the hook-switch 110, it comes into the on-hook status.

Figure 1:
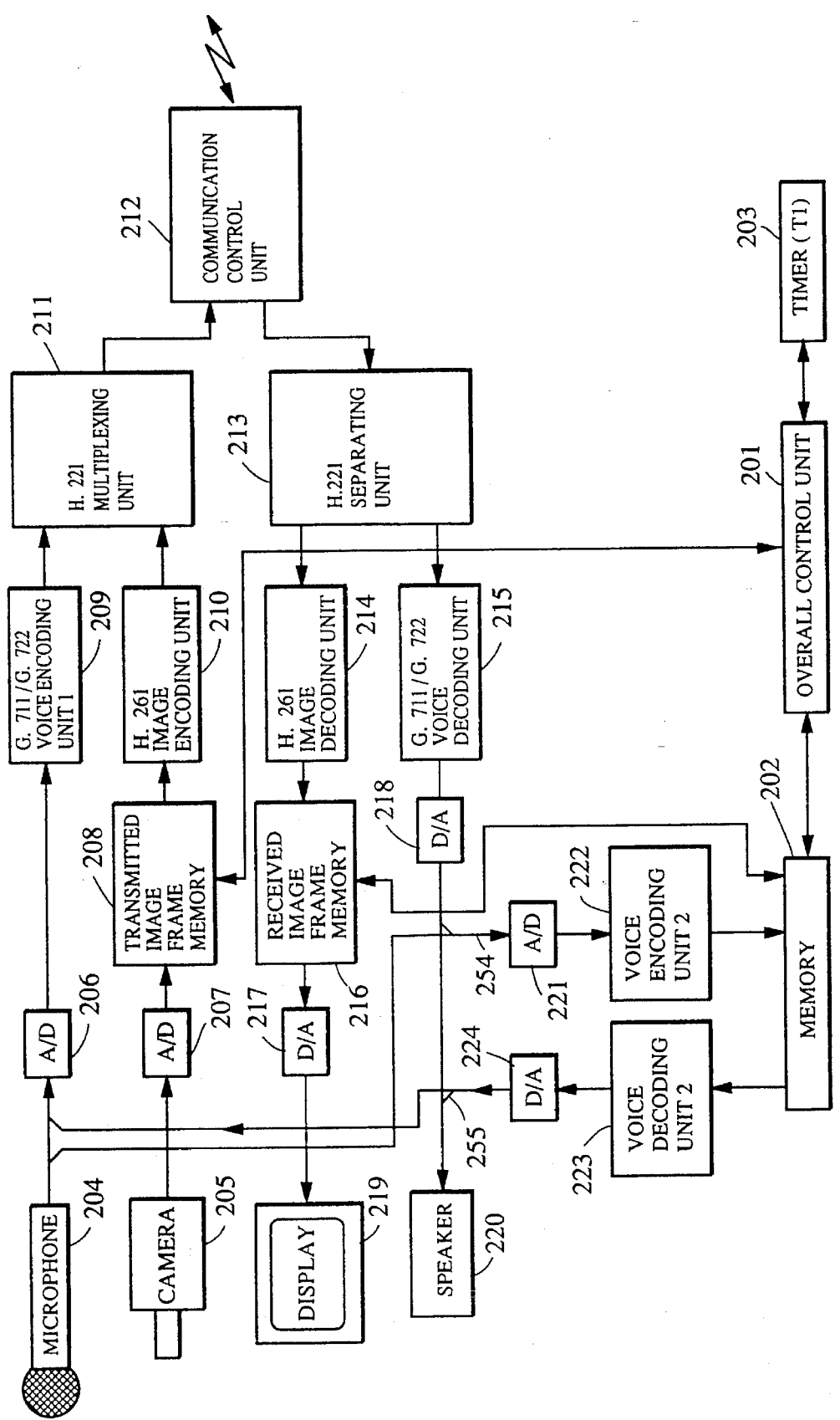
FIG. 1 is a block diagram of the construction of a first embodiment of the TV telephone apparatus of the present invention.

Referring to FIG. 1 illustrating the construction of the TV telephone apparatus of this embodiment, the microphone 204 for outputting signals corresponding to the voice of a user and the like has an output terminal connected, via an A/D converter 207, to a voice encoding unit 209 which encodes transmission voice (including other sound) data in accordance with the G.711/G.722 encoding scheme recommended by the CCITT. The camera 205 has an output terminal connected, via the A/D converter 206, to a to-be-transmitted image frame memory (hereinafter, referred to as "transmitted image frame memory") 208 which temporarily stores transmitted image (that is, an image to be transmitted) in the unit of frame. The image is stored in transmitted image frame memory 208 in the unit of frame, and then encoded. The output terminal of the transmitted image frame memory 208 is connected to an image encoding unit 210 which encodes image data in accordance with the H.261 encoding scheme recommended by the CCITT. The output terminals of the voice encoding unit 1 209 and the image encoding unit 210 are connected to a multiplexing unit 211 which multiplexes voice data and image data by the H.221 data multiplexing scheme recommended by the CCITT. The output terminal of the multiplexing unit 211 is connected to a communication control unit 212 which transmits multiplexed data to an external communication line.

The communication control unit 212 also receives multiplexed data from an external communication line and inputs the data to a separating unit 213. The receiving-side output terminal of the communication control unit 212 is connected to the separating unit 213, which separates data multiplexed by the H.221 data multiplexing scheme recommended by the CCITT, into voice data and image data.

One of the output terminals of the separating unit 213 is connected to an image decoding unit 214 which decodes image data encoded by the H.261 encoding scheme. The output terminal of the image decoding unit 214 is connected to a received image frame memory 216 which temporarily stores decoded image data in the unit of frame. The output terminal of the received image frame memory 216 is connected, via a D/A converter 217, to the display 219, which displays received image data.

The other output terminal of the separating unit 213 is connected to a voice decoding unit 215 which decodes voice data by the G.711/G.722 decoding scheme. The output terminal of the voice decoding unit 215 is connected to the speaker 220 via a D/A converter 218.

This embodiment is provided with a timer 203 for counting communication time. The timer 203 is connected to an overall control unit 201 which controls the overall operation of the TV telephone apparatus. The overall control unit 201 is connected to the transmitted image frame memory 208 and to a memory 202 storing the voice and image data used for the automatic responding operation. The memory 202 is connected to the received image frame memory 216. The memory 202 has an output terminal connected to a voice decoding unit 223 which decodes voice data compressed into 32-kbps data by the ADPCM scheme. The output terminal of the voice decoding unit 223 is connected to the speaker 220 and the microphone 204 via a D/A converter 224. The output from the microphone 204 and the D/A converter 218 is inputted via an A/D converter 221 to a voice encoding unit 222 which compresses voice data into 32-kbps data by the ADPCM scheme. The output terminal of the voice encoding unit 222 is connected to the memory 202.

[Operation Mode]

Figure 7:
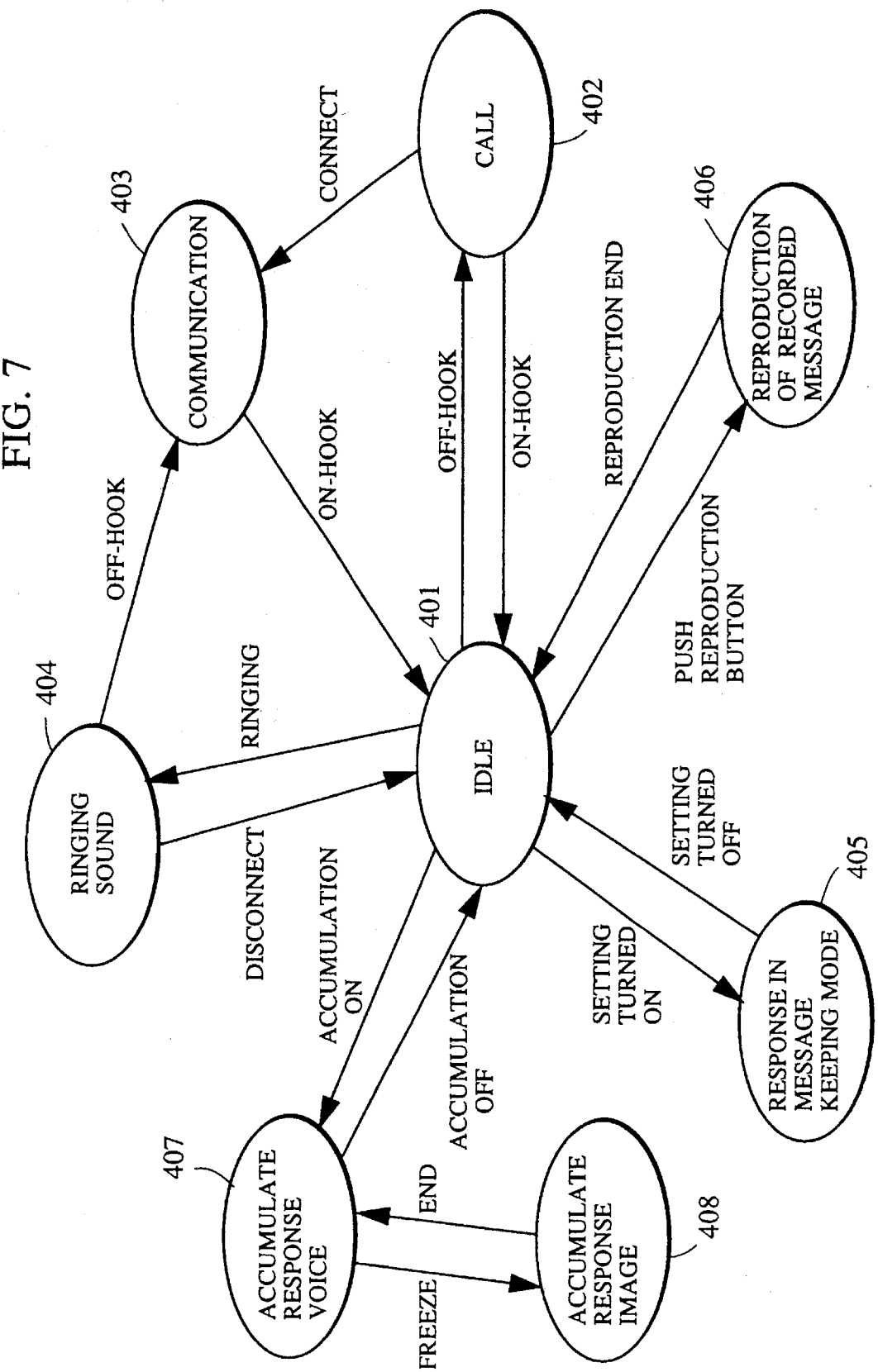
FIG. 7 illustrates the operational transitions of the first embodiment.

FIG. 7 illustrates mode transition of the first embodiment of the TV telephone apparatus of the invention. When a user picks up the handset 109 off the hook-switch 110, that is, the apparatus is off-hooked, in the idle mode 401, and dials a desired number, the apparatus goes into the calling mode 402. When the apparatus is connected to the called party via a communication line, it enters the communication mode 403. If the user puts the handset 109 back on the hook-switch 110, that is, the apparatus is on-hooked, before the apparatus is connected to the called party, the apparatus goes back into the idle mode 401. The apparatus returns from the communication mode 403 into the idle mode 401 also by on-hooking.

When the apparatus is called during the idle mode 401, it enters the incoming ringing mode 404 to cause incoming ringing. Then, when the user off-hooks, the apparatus goes into the communication mode 403. If the caller stops calling before the user picks up the handset 109, the apparatus returns into the idle mode 401.

If the user switches on the message keeping mode setting button 105 in the idle mode 401, the apparatus goes into the message keeping mode 405. The apparatus is put back from the message keeping mode 405 into the idle mode 401 by switching off the message keeping mode setting button 105. If the play-back button 106 is switched on in the idle mode 401, the apparatus goes into the recorded message reproducing mode 406 for reproducing the message recorded in the message keeping mode 405. When the message reproduction ends, the apparatus returns into the idle mode 401.

If the storing (or accumulating) button 107 is switched on while the apparatus is in the idle mode 401, the apparatus starts storing (or accumulating) a response message which is used when the apparatus receives a call in the message keeping mode 405. First, the apparatus goes into the response voice storing mode 407 for storing a voice response message. If the freeze button 108 is switched on while the a voice response message is being stored, the apparatus goes into the response image storing mode 408 for storing an image taken by the camera 205, which is used for a visual response message. When the image has been stored, the apparatus goes back into the response voice storing mode 407. The apparatus is put back into the idle mode 401 by switching off the storing button 107.

[Operation in Message Keeping Mode]

Figure 3:
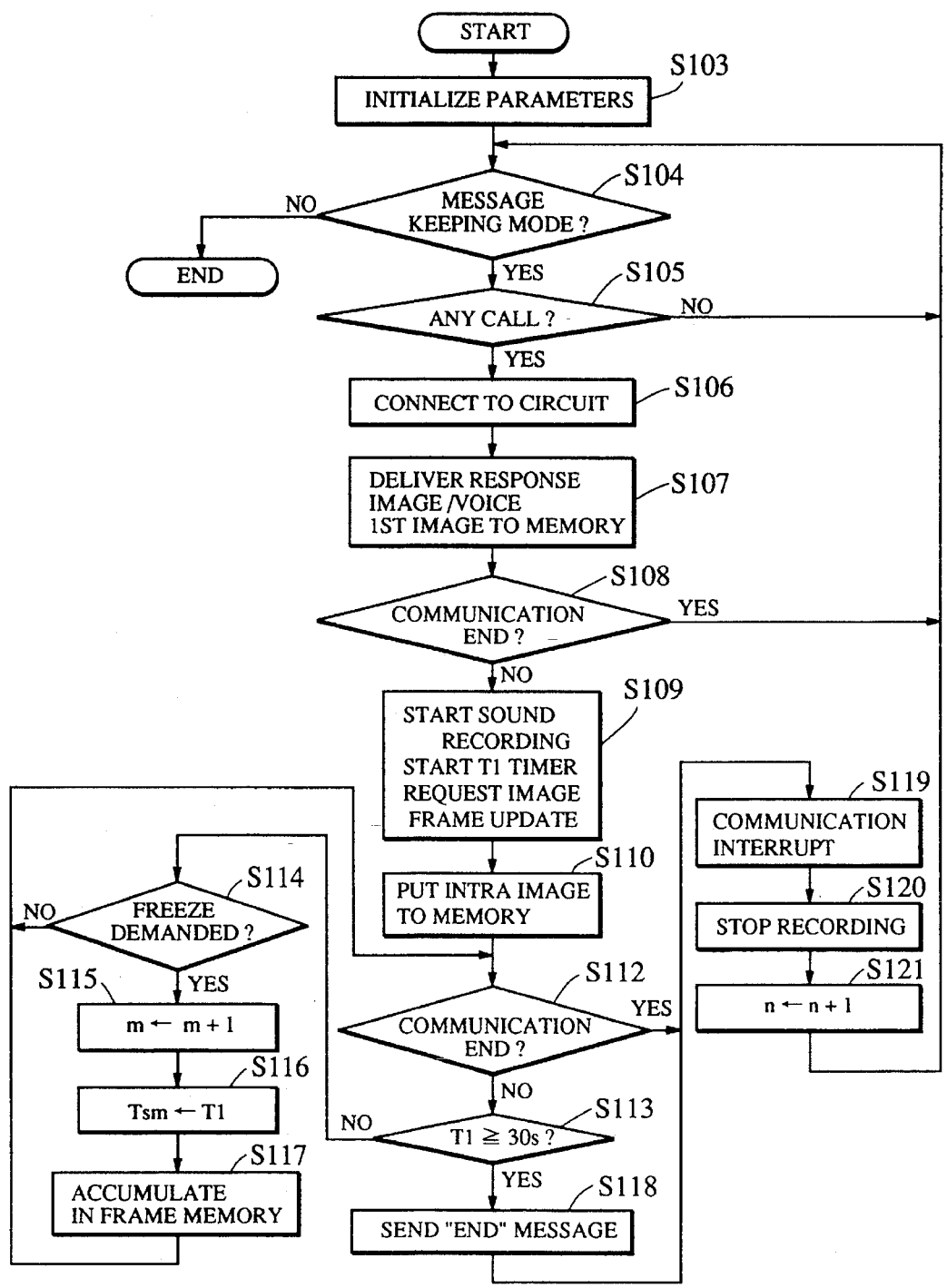
FIG. 3 is a flowchart of the operation in the message keeping mode of the first embodiment.

FIG. 3 is a flowchart of the operation in the message keeping mode of the first embodiment. The operation uses four parameters: a communication No. n; a received image No. m; a communication time length T1; and a time stamp Tsm. The communication No. n represents the serial numbers of calls received in the message keeping mode, which are numbered as "1, 2, 3, . . ." according to their incoming sequence. The received image No. n represents the serial numbers of frozen images accumulated into the memory 202 in the message keeping mode. The initial image of a communication is numbered as "0", the images subsequently accumulated are numbered as "1, 2, 3, . . ." according to their accumulation sequence. The communication time length T1 indicates the time length of each communication from its initiation to its termination. The time stamp Tsm indicates the time at which each of the images accumulated into the memory 202 is received. The time stamp Tsm is counted from the initiation of each communication. The first, second and mth-accumulated image data in each communication are provided with time stamps Ts1, Ts2 and Tsm.

The operation in the message keeping mode of this embodiment will be described hereinafter with reference to FIG. 3.

In the message keeping mode, the parameters n, m and T1 are initialized to the values n=1, m=0 and T1=0 in Step S103. In Step S104, it is determined whether the apparatus has been put in the message keeping mode. If it is determined that the apparatus is not in the message keeping mode, the operation ends. If it is determined in step 104 that the apparatus is in the message keeping mode, the operation proceeds to Step S105, where the apparatus waits for a call. The procedure in Steps S104 and S105 is repeated until the apparatus is called.

Figure 5:
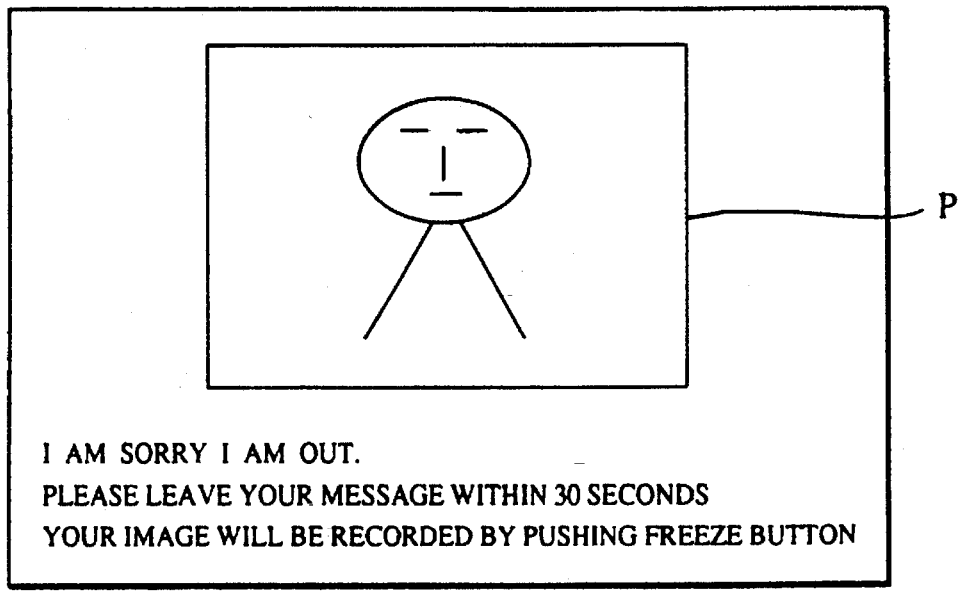
FIG. 5 shows a response image automatically displayed when a call is received in the message keeping mode.

When the apparatus is called, the apparatus connects to the circuit in Step S106. In Step S107, in order to inform the caller that the apparatus is in the message keeping mode, the apparatus writes the response data of an image (as shown in FIG. 5) which has been stored in the memory 202 beforehand, into the transmitted image frame memory 208. Then, the image data is encoded by the image encoding unit 210, and transmitted to the caller, via the multiplexing unit 211 and the communication control unit 212. In this procedure, because the image written in the transmitted image frame memory 208 is repeatedly read out, encoded and transmitted to the caller, the caller recognizes the image as a frozen image. In this manner, the apparatus transmits to the caller a visual response message, as shown in FIG. 5, which is essentially composed of a picture P of the user and a written message saying "I AM SORRY I AM OUT. PLEASE LEAVE YOUR MESSAGE WITHIN 30 SECONDS. YOUR IMAGE WILL BE RECORDED BY PUSHING FREEZE BUTTON."

Along with the transmission of the visual response message, the audio data of the voice response message which has been stored in the memory 202 separately from the image data of the visual response message is read out, decoded by the voice decoding unit 223, and then transmitted to the caller, via the D/A converter 224, the A/D converter 206, the voice encoding unit 1 209, the multiplexing unit 211 and the communication control unit 212.

Figure 4A:
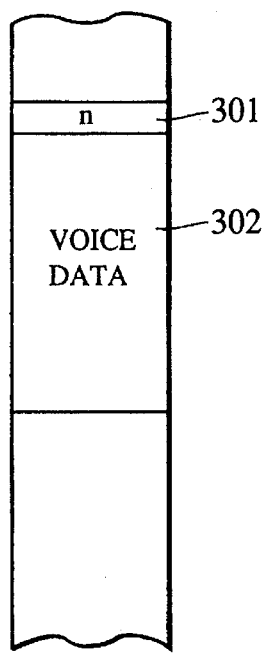
FIGS. 4(a) to 4(c) illustrate how data is stored into a memory during the recording operation in the message keeping mode.
Figure 4B:
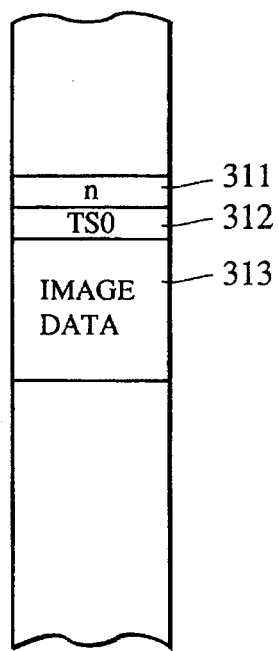

Further, simultaneously with the transmission of the visual and voice response message, the data of the first-received image is stored into the memory 202 as follows. When all the data of the first-received image is developed on the received image frame memory 216, the frame-developed data is stored as frozen image data in the memory 202. As shown in FIG. 4(b), the communication No. n of this frame and the time stamp Ts0 are recorded at the leading head of the area in which the image data of the frame is stored.

Referring back to FIG. 3, when the response message has been transmitted in Step S107, it is checked in Step S108 whether the communication is discontinued. If the caller discontinues the communication without leaving a message, the apparatus stops the message keeping operation and goes back to the call waiting status. If it is determined in Step S108 that the communication continues, the operation proceeds to Step S109, where the communication timer 203 starts counting and, simultaneously, the voice encoding unit 222 compresses the voice data from the caller and stores the data into the memory 222 in real time. In this procedure, the overall control unit 201 writes the communication No. n at the leading head of the area in which the voice data is stored. Then, the apparatus requests the calling party to update the image frame by transmitting "image frame update request command" defined by BAS (bit-rate assigning signal) in accordance with H.221 recommended by the CCITT.

According to this embodiment, it is possible to store high-quality images in the memory 202.

Figure 4C:
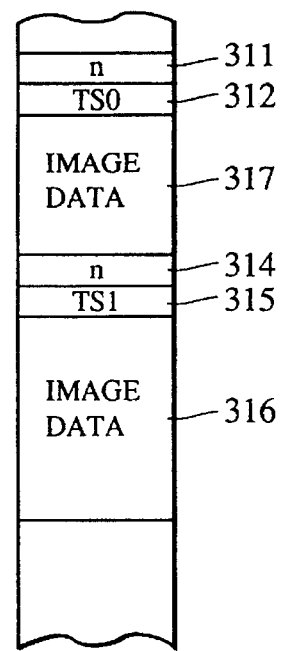

When the image frame request is completed in Step S109 and the data of the first-received INTRA-mode image (the INTRA mode will be described later) is developed on the received image frame memory 216, the data of the frame is accumulated in the memory 202 as frozen image data. As shown in FIG. 4(c), the image data 317 is overwritten into the image storing area Ts0, thus updating the image data marked with the time stamp Ts0 while the value of Ts0 remains at zero second.

In Step S112, it is determined whether the caller has disconnected the circuit. If it is determined that the caller has disconnected the circuit, the operation proceeds to Step S119, where the apparatus discontinues communication. In Step S120, the apparatus stops storing the voice data from the caller into the memory 202. In Step S121, the apparatus updates the communication No. n by adding 1, and waits for the next call.

Figure 6:
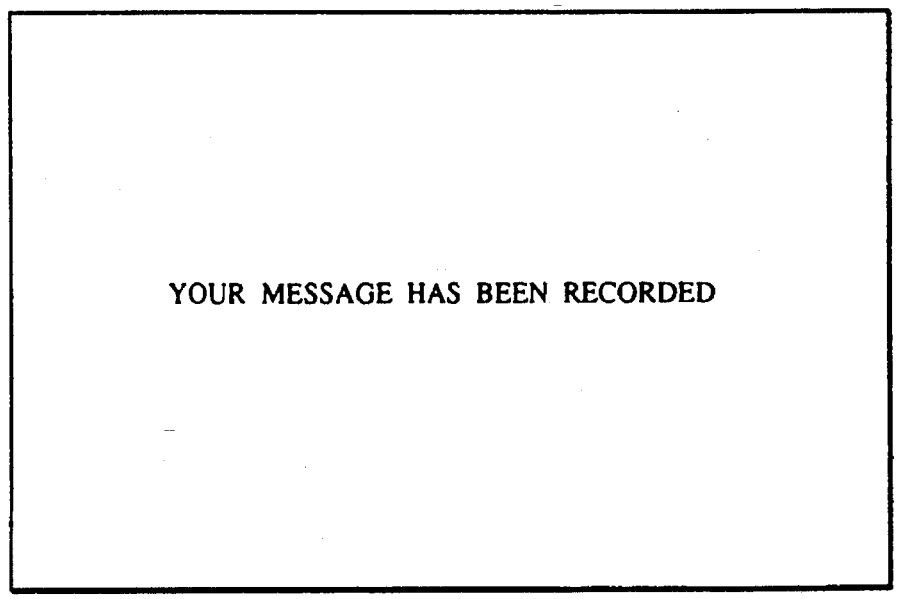
FIG. 6 shows an image indicating that a message has been recorded.

If it is determined in Step S112 that the caller has not ended the communication, the procedure goes to Step S113, where the apparatus monitors the communication timer 203. If the communication timer 203 indicates that the communication time length is 30 seconds or greater, the operation goes to Step S118, where the apparatus reads out the image data of a message indicating the end of automatic recording and the audio data of a signal sound from the memory 202, and transmits the data to the caller in the same manner as the response message is transmitted. An example of such message is shown in FIG. 6. The communication time is limited to 30 seconds in order to restrict the upper limit of room in the memory capacity required for one operation of the message recording and substantially prevent overflow of the memory 202. In this embodiment, because the voice coding unit 222 converts audio data into 32-kbps data, the room capacity of the memory 202 needed to store voice data for 30 seconds without causing overflow is 120 Kbyte at most.

If the caller still continues the communication and the communication time length has not reached 30 seconds (Steps S113 and S118), the operation goes to Step S114, where it is determined whether there is a freeze request from the caller. The apparatus determines that there is a freeze request from the caller, if it has received "frame freeze command" defined by BAS of H.221 recommended by CCITT. The reception of frame freeze command means that the caller instructs the apparatus to record his/her picture, as indicated by the message shown in FIG. 5. If the apparatus receives such a request, the apparatus updates the received image signal m by adding 1 in Step S115, and writes into the time stamp Tsm the relative communication time T1 at which the apparatus receives a freeze request, in Step S116. In Step S117, the apparatus writes into the memory 202 the image data stored in the received image frame memory 216. For example, if the apparatus receives the first freeze request at 10 seconds after the initiation of the communication, the number "10" is written into the TS1 315 and, then, the received image data is written into a memory area 316 (FIG. 4(c)). If the received image data has been accumulated in the memory 202 in Step 117, the operation returns to Step 112. The operation also returns to Step S112 if it is determined in Step S114 that there is no freeze request.

[Recorded Message Reproduction]

Herein described will be the reproduction of the image data and voice data accumulated in the message keeping mode.

If a user presses the play-back button 106 while the apparatus is in the idle mode, the apparatus goes into the recorded message reproducing mode for reproducing the image and voice data which have been accumulated in the memory 202 in the message keeping mode. The accumulated data is reproduced in accordance with the communication Nos., that is, in the ascending order of n=1, 2, 3, . . . , in this embodiment. The reproduction of the accumulated image and voice data will be described hereinafter on the assumption that: the number of recorded messages (or communication cases) is 1 (n=1); the communication time (recording time) length is 20 seconds; and the number of accumulated images is 2 (Ts0=0 second, and Ts1=15 seconds).

Figure 8:
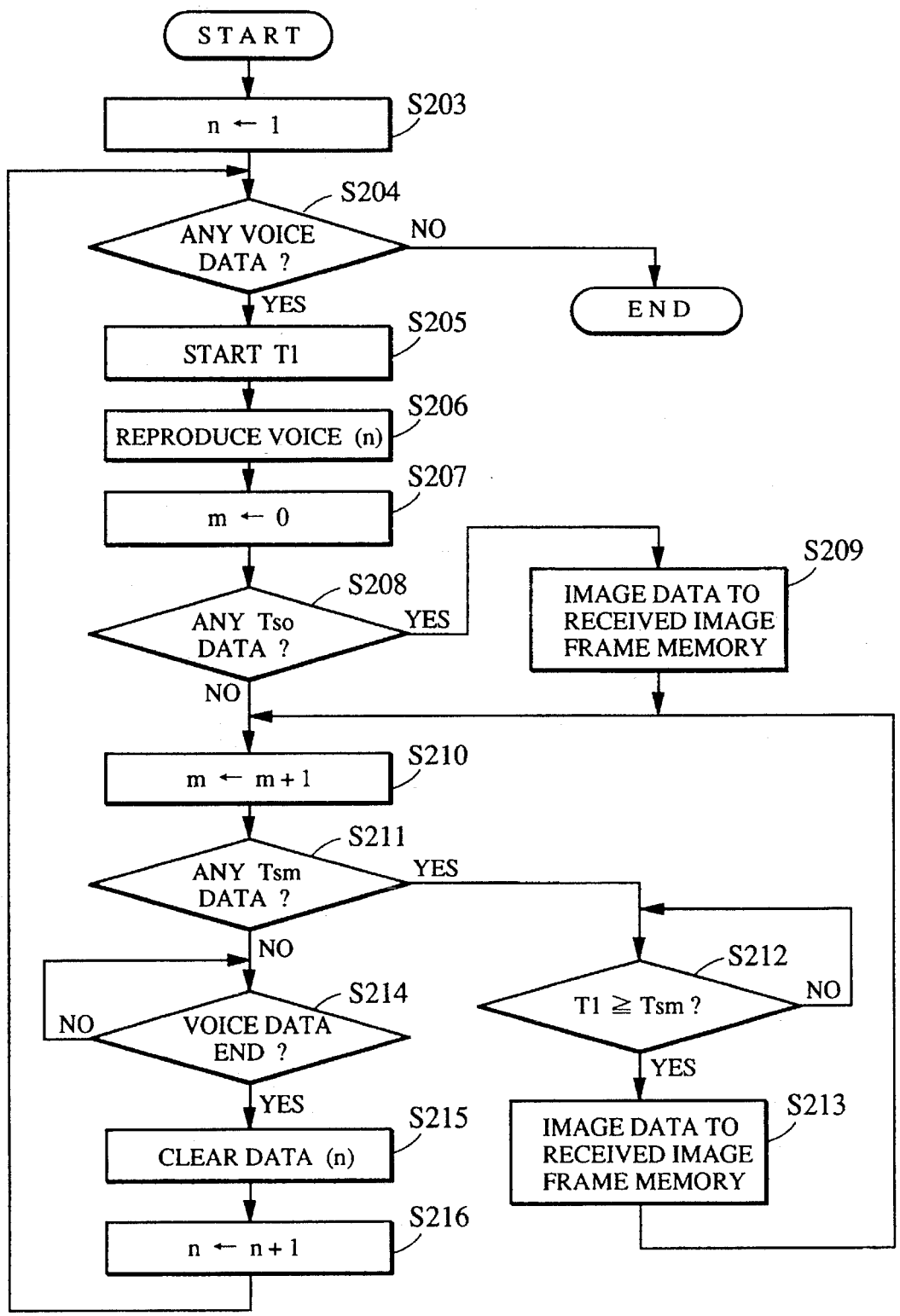
FIG. 8 is a flowchart of the operation of reproducing a recorded message.

FIG. 8 is flowchart of the operation of this embodiment in the message keeping mode. FIGS. 9(a) and 9(b) illustrate how voice and image data are accumulated in the memory in the message keeping mode of this embodiment. In FIGS. 9(a) and 9(b), the numerals 501, 503 and 506 denote communication Nos. n. Because the number of communication cases is one, all the communication Nos. n are equal to 1. Voice data 502 has been converted into ADPCM, and the amount of the voice data 502 is equivalent to 20 seconds (80 Kbytes). Relative time Ts0 504 indicates a time length counted from the communication initiation, at which the first image frame is stored. In this embodiment Ts0 is 0 second. At relative time 0 second, the first image data 505 is stored. The second image data 508 is stored at relative time Ts1 507, which is 15 seconds.

Referring to the flowchart in FIG. 8, when the apparatus is put in the message keeping mode, the parameter n is initialized to the initial value 1 in Step S203. The parameter n represents communication Nos. of recorded message data which are processed in the recorded message reproducing routine. In Step S204, the apparatus determines whether there is any voice data stored in the memory 202, by checking whether voice data having communication No. 1 is present in the memory 202. If it is determined that there is no voice data in the memory 202, which means that there is no image data, the recorded message reproducing routine ends.

If it is determined in Step S204 that there is voice data in the memory 202, the apparatus starts the timer 203 in Step S205. In Step S206, the apparatus starts reproducing the voice data 502 marked with communication No. 1, as follows. The voiced data 502 is read out from the memory 202, decoded by the voice decoding unit 223, converted into analog signals by the D/A converter 224, and then reproduced by the speaker 220 via a bus 255.

In Step S207, the parameter m is initialized to m=0. The parameter m is an accumulation image signal in the image data marked with communication No. n. In Step S208, it is determined whether there is any image data marked with a time stamp Ts0. If it is determined that there is such data, the data is transferred from the memory 202 to the received image frame memory 216. The image data thus transferred to the received image frame memory 216 is converted into analog video signals by the D/A converter 217 and then displayed on the display 219. Because the image data is repeatedly read out from the received image frame memory 216 to the display 219 until the image data is updated by the next image data, a still image is achieved on the display 219.

If the image data transfer is completed in Step S209, or if it is determined in Step S208 that there is no image data marked with a time stamp Ts0. The parameter m is updated by adding 1 in Step S210. In Step S211, it is determined whether there is any image data marked with a time stamp Ts1. If it is determined that there is such image data, the apparatus waits until the content of the timer 203 exceeds the value of the time stamp Ts1, that is, the relative time at which the image data is accumulated. Then, in Step S213, the image data marked with the time stamp Ts1 is transferred from the memory 202 to the received image frame memory 216. The image data is then converted into analog video signals and displayed on the display 219. In this procedure, the image data with the time stamp Ts0 is updated when the image data with the time stamp Ts1 is transferred to the received image frame memory 216.

When the image data with the time stamp Ts1 has been completely transferred to the received image frame memory 216, the operation returns to Step S210, where the parameter m is updated again, that is, the updated parameter m equals 2.

Because there is no image data marked with Ts2 as shown in FIG. 9(b) (also implied above), the operation proceeds from Step S211 to Step S214, where the apparatus determines whether the voice data has been reproduced. If it has been reproduced, the operation goes to Step S215, where the thus-reproduced image and voice data with communication No. 1 is erased, thereby creating an empty room in the memory 202. In Step S216, the communication No. n is updated by adding 1 to go on to the next operation.

If there are a plurality of messages recorded, the voice and image data marked with communication Nos. n=2, 3, 4, . . . are sequentially processed by the procedure from Step S204 to S216. In this description, because it has been assumed above that the number of messages is only one, that is, n=1, the apparatus determines in Step S204 that there is no voice data marked with communication No. 2, thus ending the recorded message reproducing routine.

[Accumulation of Response Message into Memory]

As illustrated in FIG. 7, the accumulation of a response message is started with the response voice accumulating mode 407. The apparatus is put into this mode by switching on the response message accumulation button 107. The analog audio signal from the microphone 204 is converted into digital signals by the A/D converter 221, and then converted by the voice encoding unit 2 222 into 32-kbps voice data, which is then accumulated into the memory 202. The apparatus is put from the response voice accumulating mode 407 back into the idle mode 401 by switching off the accumulation button 107. If the freeze button 103 is switched on during the accumulation of voice data, an image inputted by the camera 205 is converted into digital image data by the A/D converter 207. One frame of the digitized image data is stored into the transmitted image frame memory 208. Then, this frame of image data is accumulated into the memory 202 by the overall control unit 201.

[Image Encoding Mode]

Figure 10:
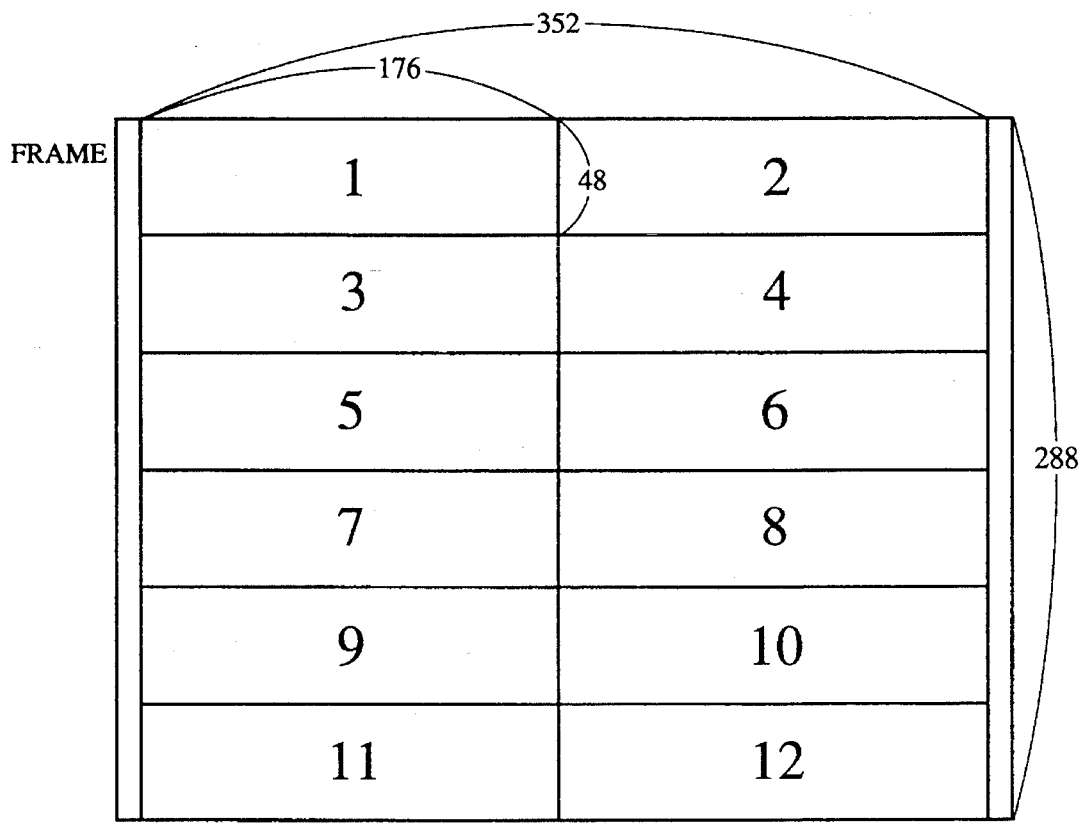
FIG. 10 illustrates the pixel construction according to the CIF format.

This embodiment transmits and receives image data based on an image format called "CIF format" illustrated in FIG. 10. The CIF format uses Y, Cb and Cr signals. The frame of the Y signal consists of 352 horizontal×288 vertical pixels. Each frame of Cb and Cr signals consists of 176 horizontal× 144 vertical pixels. Each data has an 8-bit data width. A frame of CIF-format image is composed of a group of 12 blocks called "GOB". Each GOB is composed of 33 macroblocks (MBs). Each macroblock is composed of 6 blocks consisting of four blocks for brightness signal Y, one block for color difference signal Cb and one block for color difference signal Cr. Such blocks are processed as follows. GOBs are processed in the sequence of GOB No. 1 through No. 12. The macroblocks in each GOB are processed in the sequence of MB No. 1 through No. 33, and the blocks in each macroblock are processed in the sequence of Y block No. 1 through No. 4, the Cb block and then the Cr block.

FIG. 10 illustrates the structure of pixels of the CIF format of this embodiment. The frame and GOB sizes of Cb and Cr frames are half the frame and GOB sizes of a Y frame. A macroblock can be composed of four Y blocks. No macroblock is composed only of a Cb or Cr block. Four Y blocks, one Cb block and one Cr block constitute a macroblock.

In this embodiment, the image encoding unit 210 selectively uses three modes, that is, INTER (interframe), MC (motion compensation) and INTRA (intraframe) modes, in accordance with the status of the macroblock to be processed.

Figure 11A:
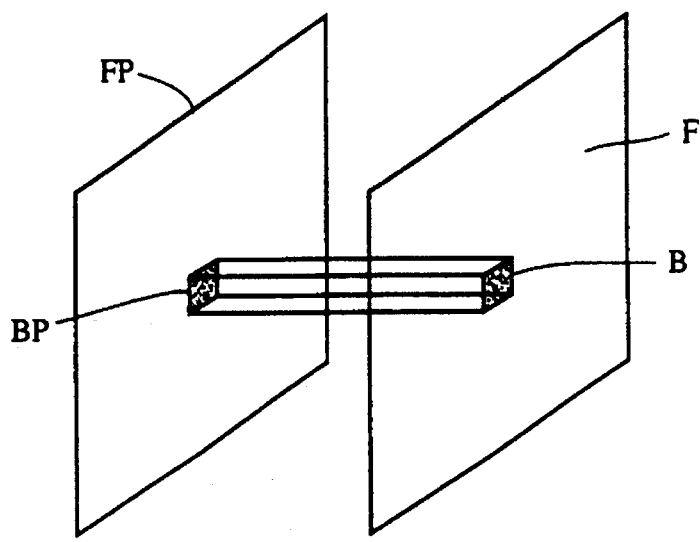
FIGS. 11(a) to 11(c) illustrate the INTER, MC and INTRA encoding modes, respectively.
Figure 11B:
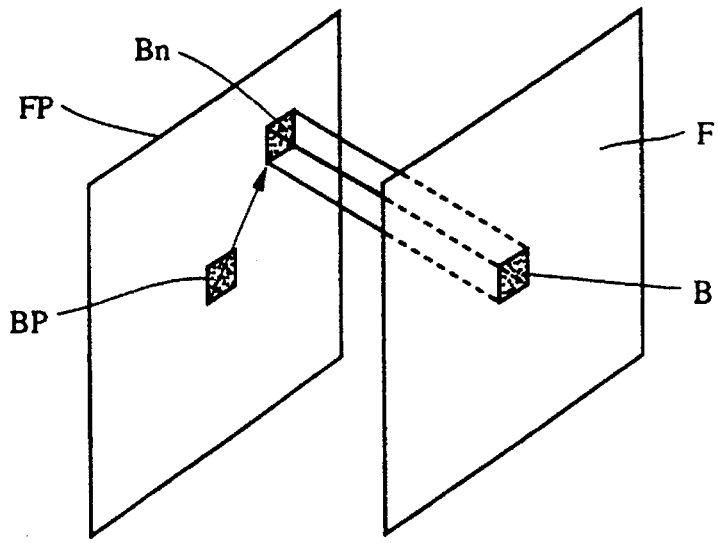
Figure 11C:
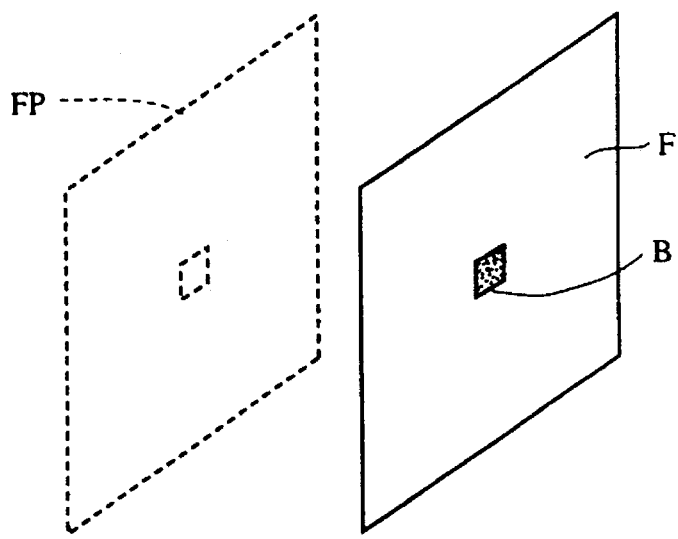

Referring to FIG. 11(*a*), the INTER mode is an interframe differential coding method which extracts the difference between a block BP on the previous frame FP and a corresponding block B on the current frame F, and encodes the difference. If an object stays still, the interframe difference becomes zero. In such a case, the INTER mode achieves a very high coding efficiency.

The MC mode is a motion-compensated interframe differential coding method. As illustrated in FIG. 11(*b*), if an object image in a block BP moves, the MC modes determines a similar block Bn apart from the block BP in the direction and distance corresponding to the motion of the object. More specifically, the block Bn is determined based on a motion vector of the object estimated from its earlier images. Then, the difference between the block Bn and the corresponding block B is encoded. The MC mode can significantly offset the defects of the simple interframe differential coding method.

The INTRA mode encodes the image data in the current block without referring to the previous frame, as indicated in FIG. 11(*c*). This mode is employed when the displacement of an object from its location in the previous frame is too large, and when the current frame has little correlation with the previous frame due to a scene change, and when the first frame of a communication is to be displayed.

The communication partner is informed of which one of the three modes is used to encode an image to be transmitted, by the MTYPE information of the H.261 recommended by the CCITT. In this embodiment, the MTYPE information on an image to be transmitted is generated by the image encoding unit 210, and the MTYPE information on a received image is determined and decoded in a suitable mode by the image decoding unit 214.

[Modifications]

Although the first embodiment requests for a frame update only in Step S109 in the flowchart shown in FIG. 3, a frame update request may be sent to a communication partner as follows. After it is determined in Step S114 that there is a freeze request, a frame update request is transmitted to the communication partner. Then, after an INTRA-mode image has been received, the INTRA-mode image data is processed by the procedure starting from Step S115. Further, though the first embodiment transmits a visual message notifying the end of accumulation when the accumulation of a message has been completed, an advance notice may be transmitted; for example, a message saying "The accumulation will end in 10 seconds." may be transmitted when a such amount of time is left for accumulation.

Although, in the first embodiment, analog video signals of a frame are digitized before being stored into the transmitted image frame memory 208, analog video signals may be stored into an image frame memory before being digitized. Similarly, the received image frame memory 216 may be a memory for storing analog video signals. Further, though the memory 202 of the first embodiment stores both image and voice data, memories may be provided respectively for image data and voice data.

As described above, because the first embodiment of the present invention transmits a frame update request signal for changing coding modes to a communication partner, and specifies the coding mode of an image from the communication partner, the embodiment can receive an image encoded in the INTRA mode, thus achieving the reception and accumulation of a high-quality visual message.

Further, because the first embodiment transmits the data for a prepared response image and voice to a communication partner when it is determined that the voice data accumulation time exceeds a predetermined length of time, the end of message accumulation can be notified to the communication partner by means of a visual message without a failure.

Still further, because the frozen image data stored beforehand in a second memory is written into a first memory which stores image data to be transmitted, and then encoded before being transmitted to the communication partner, the amount of image data becomes equivalent to one frame. Thus, the memory capacity required for the automatic response (or answer) is substantially reduced, compared with the case where motion images are used for the automatic response. Such a reduction in the required memory capacity facilitates simplifying the construction of the apparatus and reducing the production costs.

Second Embodiment

As contrasted with the first embodiment that is arranged such that the image frame updating command is, as performed in steps S109 and S110, issued to the connected TV telephone apparatus and that a high-quality image is transmitted in the INTRA mode so that the high-quality image is recorded/reproduced, a second embodiment is, as will now be described, arranged in such a manner that the image supplied from the connected TV telephone apparatus is recorded regardless of the encoding mode, the image being then reproduced from the INTRA mode image.

Figure 12:
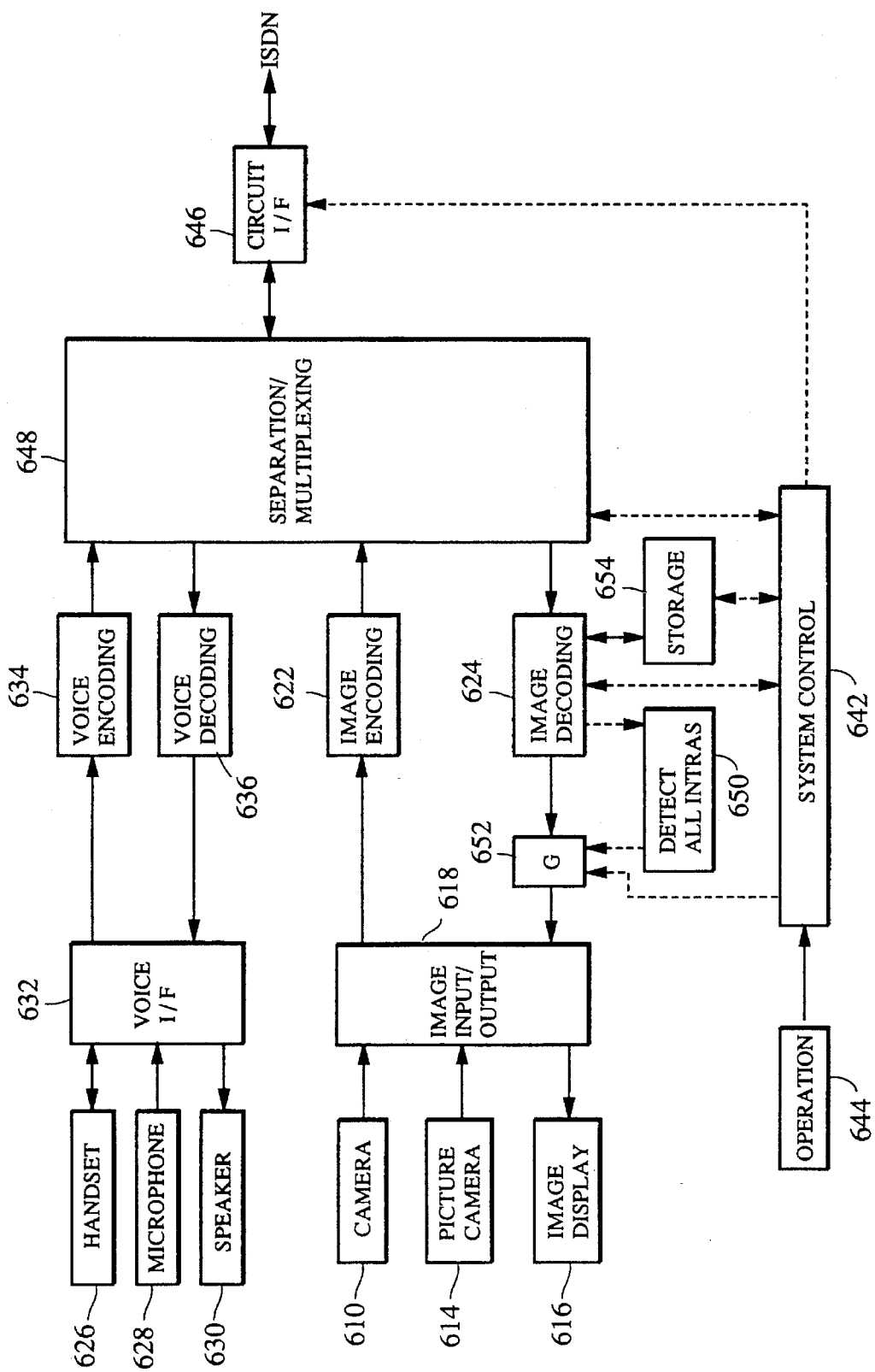
FIG. 12 is a schematic block diagram of the construction of a second embodiment of the TV telephone apparatus of the present invention.

FIG. 12 is a block diagram which illustrates the structure of the second embodiment.

Referring to FIG. 12, reference numeral 610 represents a camera for photographing attendants at a meeting, 614 represents a picture-writing camera for photographing meeting documents such as drawings, 616 represents an image display unit comprising a CRT or a liquid crystal display unit, and 618 represents an image input/output circuit that selects an image transmitted from the camera 610 or the camera 614 to be transmitted and that selects and synthesizes the output images from the cameras 610 and 614 to supply the synthesized image to an image display unit 616.

Reference numeral 622 represents an image encoding circuit for encoding the image signal to be transmitted, and 624 represent an image decoding circuit for decoding the received encoded image signal.

Reference numeral 626 represents a handset comprising a microphone and a speaker, 628 represents a microphone, 630 represents a speaker, and 632 represents a voice input/output interface to establish communications with the handset 626, the microphone 628 and the speaker 630. The voice input/output interface 632 performs an echo cancellation process and a process for generating tones, such as the dial tone, the call tone, the busy tone and the call receipt tone as well as changing over the voice input and output of the handset 626, the microphone 628 and the speaker 630.

Reference numeral 634 represents a voice encoding circuit for encoding a voice signal which is supplied through the voice input/output interface 632 for transmitting the voice signal. Reference numeral 636 represents a voice decoding circuit that decodes the received encoded voice signal to transmit it to the voice input/output interface 632.

Reference numeral 642 represents a system control circuit for controlling the system, and 644 represents a control unit for inputting various instructions to the system control circuit 642, the control unit being a keyboard, a touch-panel, or a digitizer or a pointing device such as a mouse.

Reference numeral 646 represents a circuit interface of a communication line (for example, the ISDN circuit). Reference numeral 648 represents a separation/multiplexing circuit that multiplexes information supplied from the image encoding circuit 622 and the voice encoding circuit 634 and control information supplied from the system control circuit 642 into a H.221 format to supply them to the circuit interface 646. Further, the separation/multiplexing circuit 648 separates image, voice and control signals from information supplied from the circuit interface 646 to supply the signals to the image decoding circuit 624, the voice decoding circuit 636 and the system control circuit 642, respectively.

Reference numeral 650 represents an all INTRA detection circuit for detecting whether or not the compressed image information in one received frame has been encoded in an inter-frame manner. Reference numeral 652 represents a gate circuit which is usually opened and which is closed in response to an output from the detection circuit 650 and a control signal supplied from the system control circuit 642. Reference numeral 654 represents a storage unit for storing received compressed image information when the message keeping function is turned on. The gate circuit 652 and the all INTRA detection circuit 654 act only when recorded image information is reproduced.

The flow of the image signal and the voice signal realized when the message keeping function according to the embodiment shown in FIG. 2 is turned on will briefly be described below.

The image inputted through the camera 610 or the picture writing camera 614 is selected by the image input/output circuit 618 and supplied to the image encoding circuit 622. The image encoding circuit 622 encodes the supplied image signal in accordance with an encoding mode that conforms to the control signal supplied from the system control circuit 642 and to the internal decision, the encoded signal being transmitted to the separation/multiplexing circuit 648.

The voice signal inputted through the microphone of the handset 626 or the microphone 628 is received by the voice encoding circuit 634 by way of the voice input/output interface 632 to be encoded before it is supplied to the separation/multiplexing circuit 648.

The separation/multiplexing circuit 648 multiplexes the encoded signals supplied from the image encoding circuit 622 and the voice encoding circuit 634 and a control command supplied from the system control circuit 642 to transmit them to the circuit interface 646. The circuit interface 646 transmits the signal supplied from the separation/multiplexing circuit 648 to a connected communication line in a predetermined format.

A signal supplied from the communication line is supplied to the separation/multiplexing circuit 648 through the circuit interface 646. The separation/multiplexing circuit 648 separates the encoded image signal, the encoded voice signal, data and the control command from the received signal to supply them to the image decoding circuit 624, the voice decoding circuit 636 and the system control circuit 642.

The image decoding circuit 624 decodes the encoded image signal supplied from the separation/multiplexing circuit 648, decoded information being supplied to the image input/output circuit 618 by way of the gate circuit 652. The image input/output circuit 618 selects and synthesizes the image supplied from the camera 610 or 614 and the image supplied from the gate circuit 652 to supply the result of the synthesis to the image display unit 616. The image input/output circuit 618 performs the synthesis process, such as a picture-in-picture process and a process of fitting the image to a corresponding window in a window display system. As a result, the supplied image and/or the received image is displayed on the image plane of the image display unit 616.

The received voice signal decoded by the voice encoding circuit 636 is supplied to the speaker of the handset 626 and/or the speaker 630 by way of the voice input/output interface 632. As a result, the voice of the person on the other side of the telephone line can be heard.

Figure 13:
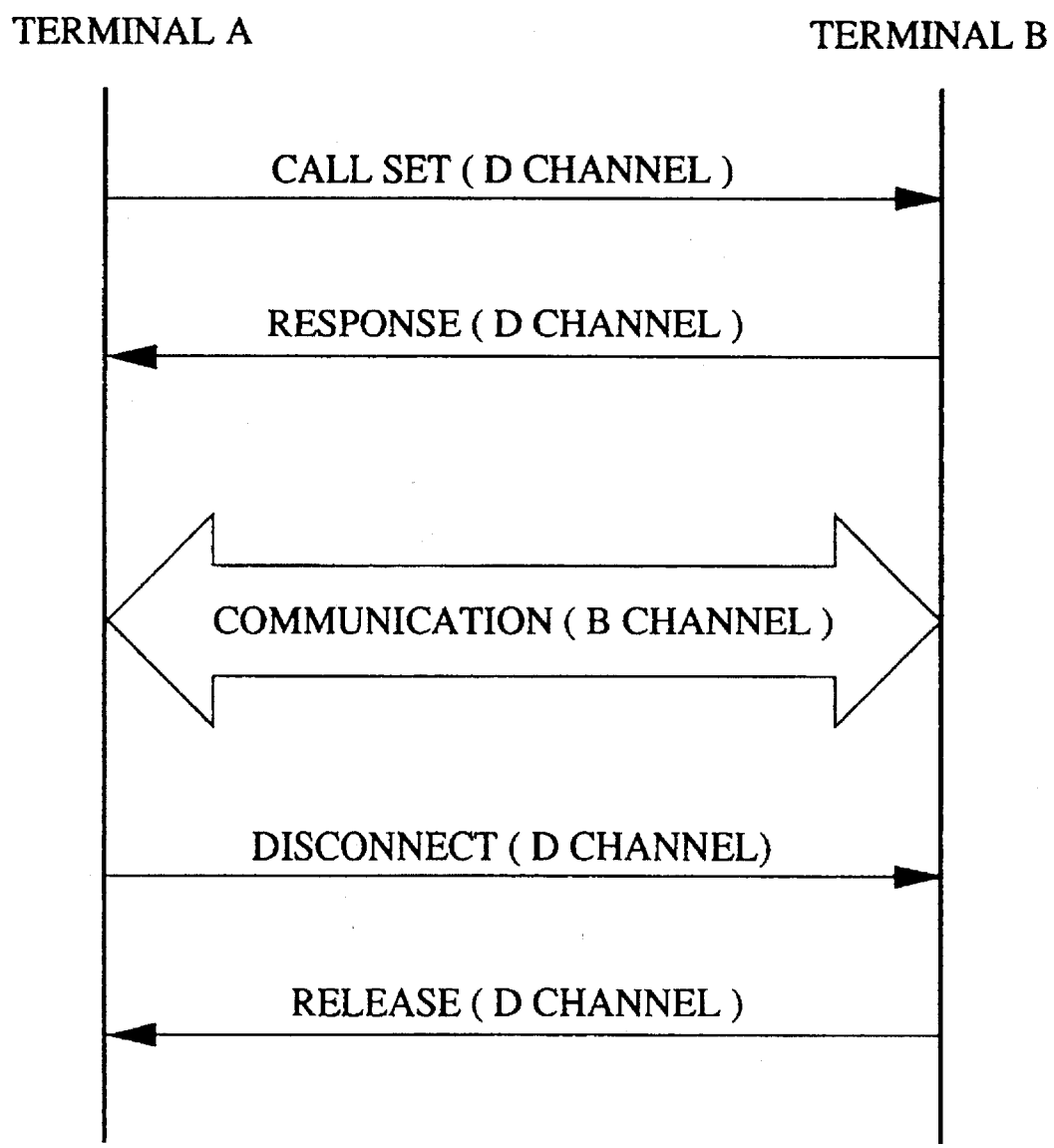
FIG. 13 illustrates the procedure from call setting to disconnection.

A method of a negotiation of terminal ability and conversion of the same will now be described while giving an example of the ISDN circuit. With the ISDN circuit, call is made by using an out-band signal (that is, a channel D) as shown in FIG. 13. As shown in FIG. 13, call setting from terminal A to terminal B and response made from the terminal B to the terminal A enable communication to be performed by making use of channel B. Although other communication passages channel D, H0 and H1 are available, the description will be made about only the channel B.

By making use of the channel B thus-communicated, the in-band signal procedure shown in FIG. 14 is executed in accordance with recommendation H.242. As a result, portions of channel B are assigned to data and to control for controlling the communication. The control performed by the control portion in the channel is called an "in-channel control".

The frame structure in the channel B for executing the in-channel control is shown in FIGS. 15(*a*) through 15(*c*).

Figure 15A:
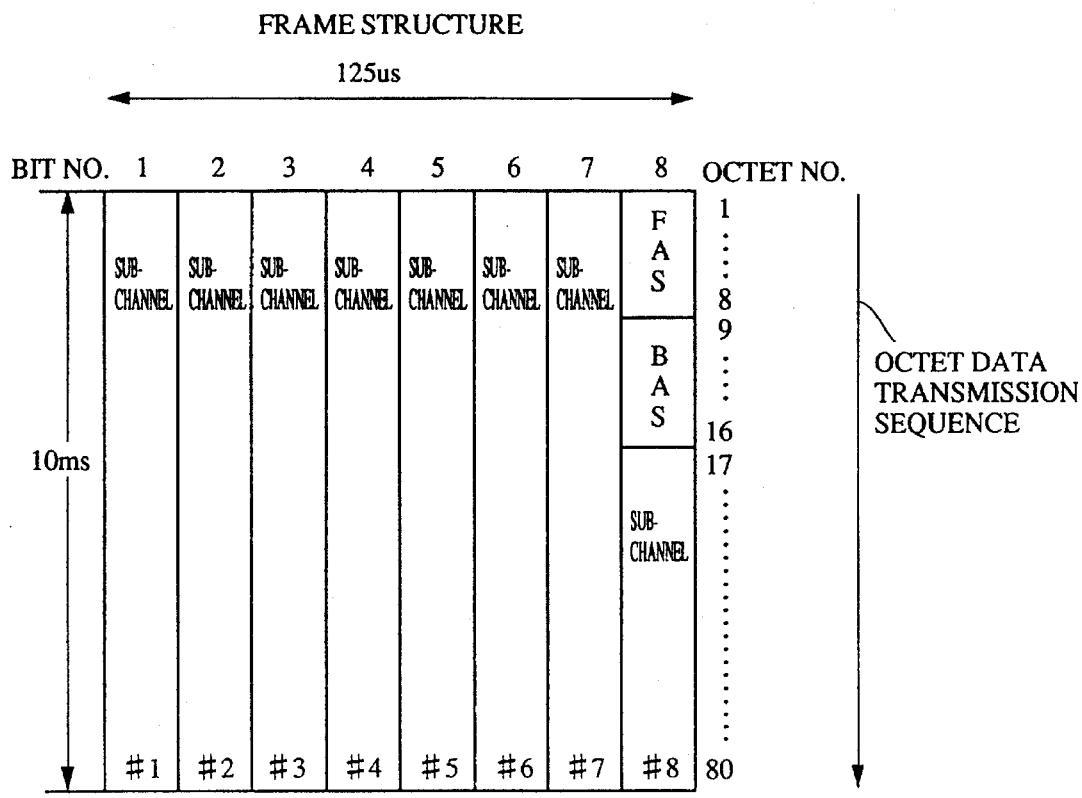
FIGS. 15(a) to 15(c) illustrate the H.221 frame structure.
Figure 15B:
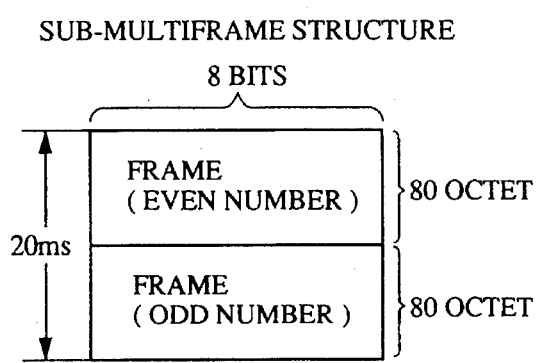
Figure 15C:
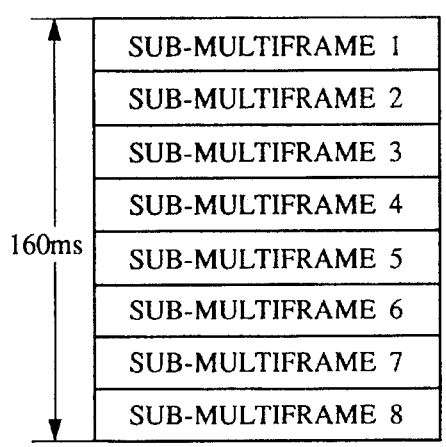

FIG. 15(a) illustrates a multi-frame structure of the channel B (64 Kbps). The multi-frame structure is arranged while making 1 octet/125 μs to be a standard in such a manner that 1 frame is composed of 80 octets as shown in FIG. 15(a), 1 sub-multiframe is composed of 2 frames as shown in FIG. 15(b) and 1 multiframe is composed of 8 sub-multiframes as shown in FIG. 15(c). In the bit direction, 8 sub-channels No. 1 to No. 8 are defined each of which is composed of 8 Kbps.

However, the sub-channel No. 8 has a transfer rate of 6.4 Kbps and includes a FAS (Frame Alignment Signal) and a BAS (Bit-rate Allocation Signal) inserted thereto as control bits. The FAS and BAS enable the channel B to be controlled in the in-channel manner.

The FAS is used to synthesize the frame and the multi-frame. The BAS is used to exchange information of terminal ability or to set ability needed to determine the multiplexing method of the sub-channels and the like. In particular, the BAS can be changed over at each sub-multiframe (20 ms) even if data is being communicated.

The in-band signal process shown in FIG. 14 will now be described briefly. When the channel B has been brought to a communication-enabled state, both of the terminals A and B transmit the FAS. The terminal ability at this time is mode 0 (a mode voice, FAS and BAS) in the initial state. The FAS is retrieved by the other-side terminal. If the frame synchronization establishment condition defined by H.242 has been met, the bit structure A in the FAS shown in FIG. 16(a) is made to be "0" and transmission is performed. When the terminal receives A=0, a fact that the other-side terminal has established the synchronization can be confirmed. Thus, a so-called transmission ability is exchanged.

Then, ability information of the user's terminal is transmitted to the other-side terminal by making use of the BAS to confirm mutually the abilities. If the communication has been enabled at this time, data communication is commenced. If the ability must be changed, the BAS is used as a command to transmit the terminal ability simultaneously. After the other-side terminal has set the ability thereof, the data communication is commenced.

The data communication is arranged in such a manner that the transmission and the receipt are made independent from each other. Further, each of the establishment of the synchronization and setting of the terminal ability is performed individually. Therefore, the synchronization can be stepped out in either direction or the types of data are different between the transmission and the receipt.

When the call is disconnected after the data communication has been completed, the terminal (terminal A shown in FIG. 14), that is intended to disconnect the communication, uses the BAS to realize the mode 0. Then, the out-band process for channel D as shown in FIG. 13 is employed to perform disconnection and release so that the communication is completed.

FIG. 16 illustrates the bit structure in the FAS. Bit A indicates whether or not the frame synchronization is stepped out, and bit E indicates whether or not a CRC error has occurred. Bits C1, C2, C3 and C4 are bits of CRC4, bits N1 to N5 act to number the multiframe, and bits R1 to R4 are channel Nos. Symbol TEA represents a terminal unit alarm which is set to "1" if response to the received signal cannot be performed due to a failure in the terminal.

FIG. 17 illustrates the bit structure in the BAS. As shown in FIG. 17(a), the upper 3 bits denotes the attribute, and residual 5 bits indicate the attribute values of the attribute. FIG. 17(b) illustrates the contents of the attribute. The attribute values are, for example, the transfer rate value and a parameter value peculiar to the codic type, the media type and the information type.

Since H.261 recommendation enables communication to be performed among a plurality of standards such as the NTSC signal, the PAL signal and the digital television signal, a common video format is determined, that is, the CIF format and the QCIF format are available. The CIF format has a number of samples of 352 pixels ×288 lines for brightness signal Y and 176 pixels ×144 lines for color difference signals Cr and Cb. The QCIF format has an information quantity which is a quarter of that of the CIF format, that is, the number of samples is 176 pixels ×144 lines for the brightness signal Y and 88 pixels ×72 lines for the color difference signals Cr and Cb.

The following component functions for the compression method are available: a in-frame encoding function with which the image in the frame is sectioned into blocks of 8 pixels ×8 pixels to two-dimensional discrete-cosine-transform (DCT) the image; an inter-frame encoding function for two-dimensional DCT the difference between the frames; a movement compensation function that compensates the image movement between the frames to reduce the quantity of generated codes; a zero-run-length encoding function that makes uses a fact that the DCT coefficient has continuous a value zero in a high frequency region; a quantizing function for changing the quantizing step size in accordance with the quantity of generated data; a variable-length encoding function for allocating a short code value to a data pattern that is generated frequently and allocating a long code value to a data pattern that is not generated frequently; and a frame stepping function for stepping a frame. By combining the foregoing functions, a high compression ratio can be achieved so that the kinetic image can be transmitted through a low-rate communication passage.

The structure of the transmission frame will now be described briefly. FIG. 18 illustrates the structure of an error correction frame by using a BCH code. One frame is composed of a 1-bit error correction frame bit, a 1-bit file identifier, a 492 bit image data, and an 18-bit error correction parity, the one bit therefore having 512 bits. One multiframe is composed by collecting 8 frames each of which is structured as described above.

Figure 19A:
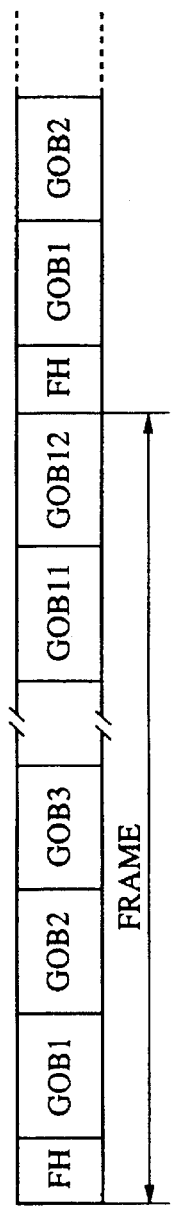
FIGS. 19(a) and 19(b) illustrate the structure of image data multiplexing frames.

FIG. 19 illustrates the structure of the multiplexed frame. One image plane is sectioned into 12 blocks (in the case of the CIF, it is sectioned into 3 blocks in the case of the QCIF as described later). One of the blocks is formed into a group of blocks (GOB), and data in each GOB is sequentially transmitted after the frame header FH has been transmitted. A method of sectioning the GOB is shown in FIG. 20. The GOB is arranged to have a number of samples of 176 pixels ×48 lines for the brightness and 88 pixels ×24 lines for the color differences Cr and Cb. The foregoing quantity is 1/12 of the CIF format and 1/3 of the QCIF format. As contrasted with the CIF format in which numbers are given to the GOBs from 1 to 12, the QCIF format is arranged in such a manner that numbers are given to the GOBs as 1, 3 and 5.

Figure 19B:
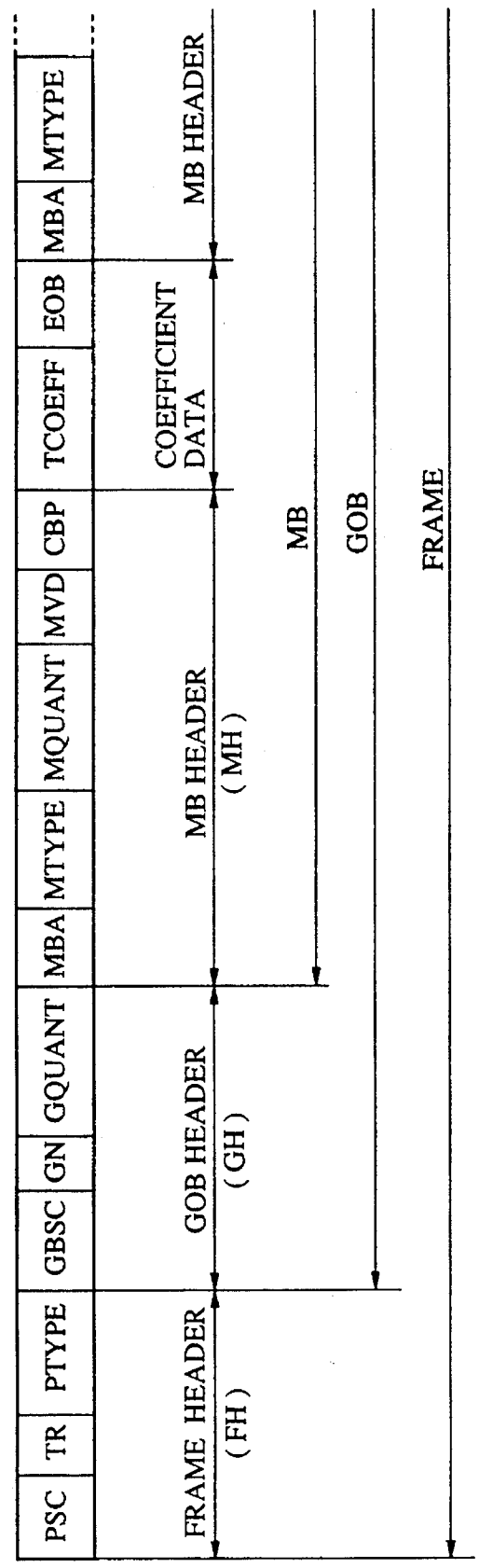

FIG. 19B illustrates the detailed structure of the frame header FH and the leading portion of the ensuing GOB1. The frame header FH is composed of 20-bit frame start code PSC, a 5-bit frame No. TR and a 6-bit type information PTYPE. The frame start code PSC has a structure "0000 0000 0000 0001 0000". The value of TR ranges from "1" to "30". The type information PTYPE is composed of split screen instruction information, a picture writing camera instruction information, and image frame freezing cancellation and information-source format instruction information (information indicating CIF or QCIF).

The GOB region includes a GOB header, and needed number of pairs each consisting of a MB header and coefficient data follow the GOB header. One GOB is composed of 33 macroblocks (MB) each of which is composed of 6 blocks (four brightness signals Y, one color difference signal Cr and one color difference signal Cb) of 8 pixels ×8 lines. The blocks of the brightness signal are given numbers 1 to 4, the color difference signal Cb is given number 5, and the color difference signal Cr is given number 6.

The GOB header is composed of a 16-bit GOB start signal (BGSC), a 4-bit GOB No. (GN) and a 5-bit quantization characteristic information (GQUANT). The GBSC has a structure "0000 0000 0000 0001". The value of GN ranges from "1" to "12". Assuming that GN is "0", GBSC + GN of PSC of FH and that of GOB of FH are 20 bits, causing continuous same bit columns to be formed. Therefore, "0" cannot be allocated to GN. The quantization characteristic information GQUANT is information about the quantization step size.

The MB header is composed of macroblock address (MBA) indicating the position of the macroblock (MB), macroblock type information (MTYPE), quantization characteristic information (MQUANT), movement vector information (MVD) and significant block pattern information (CBP).

The macroblock address MBA is an absolute value with respect to the macroblock, and it is a relative value (the difference) with respect to the ensuing macroblock, the macroblock address MBA having a variable length. The macroblock type information MTYPE indicates the type of the process to which the macroblock has been subjected, the process being an in-frame encoding (INTRA) process, an inter-frame difference encoding (INTER) process, a movement compensated inter-frame difference encoding (MC) process and a filtering process (FIL). The quantization characteristic information MQUANT is the same as GQUANT. The significant block pattern information CBP has, as information, effective block Nos. in the four blocks is the brightness signal Y in the macroblock and the blocks of the color difference signals Cr and Cb.

Following the MB header, image data formed into the compressed code is present as described above such that significant blocks of the four brightness signal blocks and blocks of the color difference signals Cr and Cb are present.

PSC of the frame header FH and GBSC and GN of GOB are selected so as to be a sole data pattern in order to detect the frame header and the GOB header at the time of the decoding operation.

Figure 21:
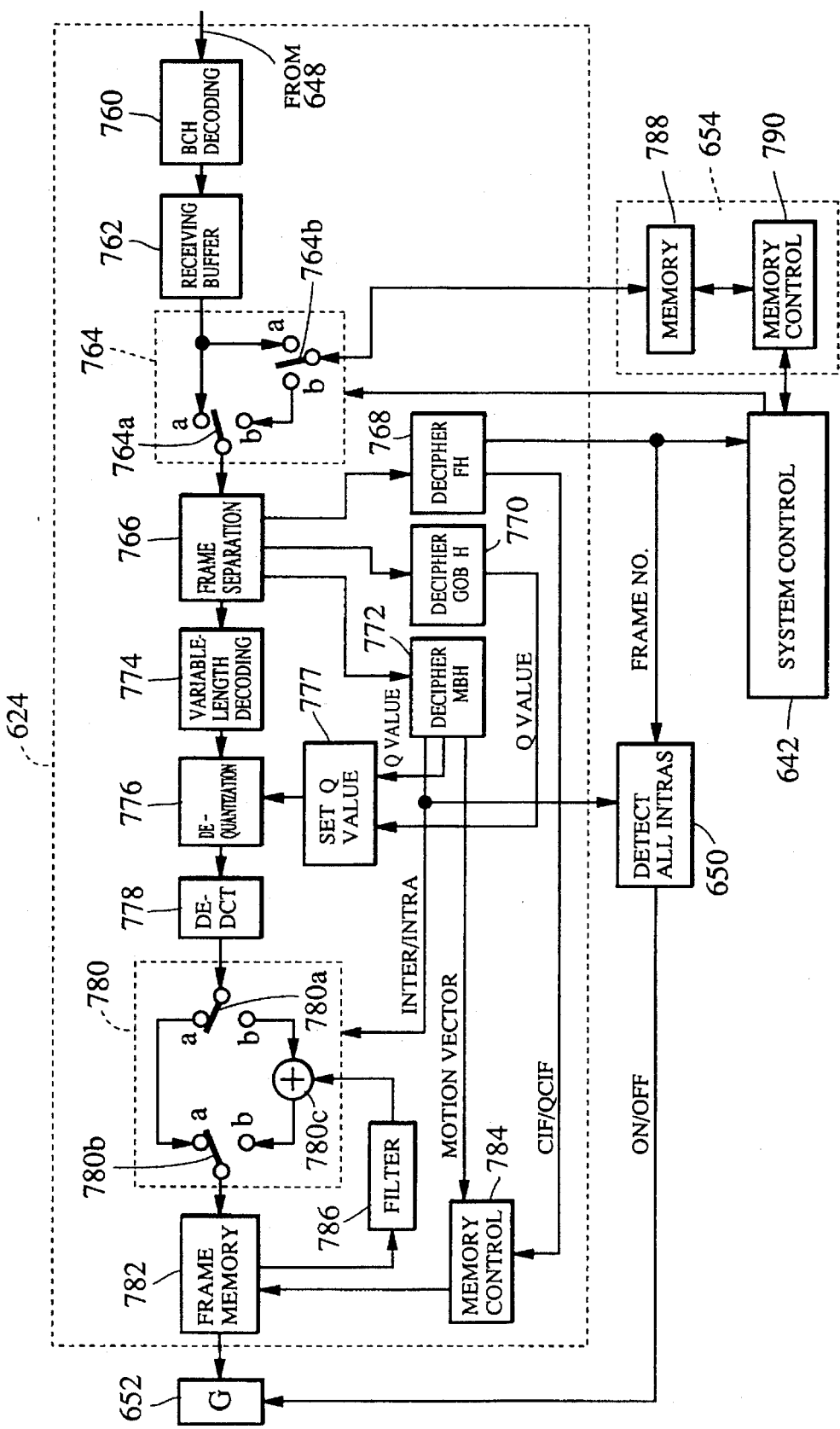
FIG. 21 is a schematic diagram of a characteristic portion of the second embodiment illustrated in FIG. 12.

FIG. 21 is a block diagram which illustrates an essential structural portion of this embodiment in the structure shown in FIG. 12. Reference numeral 760 represents a BCH decoding circuit, 762 represents a receiving buffer, and 764 represents a switch circuit for interposing a storage unit 654 in order to perform the message keeping operation, the switch circuit 764 being composed of two switches 764a and 764b. Reference numeral 766 represents an image frame separation circuit for separating header information, specifically, the frame header FH, the GOB header and the MB header from the multiplexed frame shown in FIG. 19.

Reference numeral 768 represents a FH decoding circuit for decoding the frame header FH separated in the separation circuit 766, the FH decoding circuit being arranged to transmit frame No. information, format information of CIF/QCIF, a freezing cancellation command and picture writing camera instruction information. Reference numeral 770 represents a GOBH decoding circuit for decoding the GOB header separated in the separation circuit 766, the GOBH decoding circuit 770 being arranged to transmit quantization step size information. Reference numeral 772 represents a MBH deciphering circuit for decoding the MB header separated in the separation circuit 766, the MBH deciphering circuit being arranged to transmit information indicating the in-frame encoding (INTRA) process or the inter-frame (INTER) process and the movement vector.

Reference numeral 774 represents a variable-length decoding circuit for variable-length-decoding compressed image data supplied from the image frame separation circuit 766. Reference numeral 776 represents a de-quantizing circuit for de-quantizing the output from the variable-length decoding circuit 774. Reference numeral 777 represents a quantization value setting circuit for setting the quantization step size of the de-quantizing circuit 776 in accordance with quantization value information supplied from the GOBH deciphering circuit 770) and the MBH deciphering circuit 772. Reference numeral 778 represents a de-DCT circuit for de-discrete cosine transforming (DCT) the output from the de-quantization circuit 776. The output from the de-DCT circuit 778 is the decoded image data or the difference data between frames.

Reference numeral 780 represents a calculating circuit for transmitting the output from the de-DCT circuit as it is or adding the pixel value of the previous frame to the output before the transmission, calculating circuit 780 being composed of two switches 780a, 780b and an adder 780c. The switches 780a and 780b are changed over in synchronization with each other in response to an INTER/INTRA identification signal transmitted from the MBH deciphering circuit 772 in such a manner that both of the switches 780a and 780b are connected to contact a in the case of the INTRA to transmit the output from the de-DCT circuit 178 as it is and are connected to contact b in the case of the INTER to add the pixel value to the output from the de-DCT circuit 778 before the transmission of the result of the addition.

Reference numeral 782 represents a frame memory for storing image data transmitted from the calculating circuit 780 for two image planes (frames) consisting of the present frame and the previous frame. Reference numeral 784 represents a memory control circuit for controlling the frame memory 782 in accordance with CIF/QCIF information supplied from the FH deciphering circuit 768 and motion vector information supplied from the MBH deciphering circuit 772. Reference numeral 786 represents a filter that limits the band of decoded image data supplied from the previous frame storage region of the frame memory 782 to apply it to the adder 780c.

The storage unit 654 comprises a large capacity memory 788 and a memory control circuit 790 for controlling reading/writing to and from the memory 788. As a storage medium, a solid memory, a magnetic disk, an optical disk or an optomagnetic disk may be used.

The system control circuit 642 receives frame No. information, CIF/QCIF format information, freezing cancellation command and picture writing camera instruction information supplied from the FH deciphering circuit 768. The all INTRA detection circuit 650 receives frame No. information supplied from the FH deciphering circuit 768 and receives INTER/INTRA identification information supplied from the MBH deciphering circuit 772 to transmit a signal for controlling opening/closing of the gate circuit 652.

Description will be made about the operation of the system shown in FIG. 21 in a case of an absence mode, that is, in a case where the message keeping function is actuated. When a call is detected in the absence mode, the call is connected as described above so that the BCH decoding circuit 760 decodes the BCH frame shown in FIG. 18 and transmits received data in the image data multiplexing frame structure shown in FIG. 19. The foregoing output is supplied to the switch circuit 764 by way of the receiving buffer 762. The system control circuit 642 connects the switch 764b of the switch circuit 764 to the contact a in accordance with the connection of the call. As a result, received data in the image data multiplexed frame structure shown in FIG. 19 is supplied to the storage unit 654. The system control circuit 642 causes the memory control circuit 790 to control the writing region on the memory 788.

If a call disconnection command has been issued or received data stored in the memory 788 of the storage unit 654 has been enlarged to a predetermined volume, the system control circuit 642 disconnects the call and next call standby mode commences.

The operation for reproducing image information kept during absence will now be described. In accordance with an instruction of the reproduction, the system control circuit 642 closes the gate circuit 652 and connects both of the switches 764a and 764b to the contact b. Then, the system control circuit 642 reads received data stored in the memory 788 of the storage unit 654 and transfers it to the image frame separation circuit 766 by way of the switch circuit 764.

The image frame separation circuit 766 separates the frame header FH, the GOB header and the MB header from the supplied image data multiplexed frame structure, supplies each of the header information to the FH deciphering circuit 768, the GOB deciphering circuit 770 and the MB deciphering circuit 772, respectively, and supplies compressed image data to the variable length decoding circuit 774. The FH deciphering circuit 768, the GOBH deciphering circuit 770 and the MB deciphering circuit 772 respectively decipher header information.

That is, the FH deciphering circuit 768 identifies the format (the CIF or the QCIF) of the frame, which is being processed, in accordance with the PTYPE contained in the frame header, and transmits identification information to the memory control circuit 784 and the system control circuit 642. The FH deciphering circuit 768, in accordance with TR information, also identifies the frame No. of the frame, which is being processed, to transmit the result of the identification to the all INTRA detection circuit 650.

The GOBH deciphering circuit 770, in accordance with GQUANT information, discriminates the quantization value (value Q) of the macroblock (MB) of the GOB, which is being processed, to supply the result to the quantization value setting circuit 777. The MB deciphering circuit 772, in accordance with MB header MTYPE information, discriminates whether the macroblock, which is being processed, is an in-frame encoded (INTRA) block or an inter-frame encoded (INTER) block to supply INTRA/INTER identification information to the calculation circuit 780 and the all INTRA detection circuit 650. The MB deciphering circuit 772, in accordance with MTYPE information, discriminates whether or not the movement compensation (MC) has been performed and supplies the motion vector to the memory control circuit 784 if the movement compensation has been performed.

Image information separated by the image frame separation circuit 766 is variable-length-decoded by the variable length decoding circuit 774 to be supplied to the de-quantizing circuit 776. The de-quantizing circuit 776 de-quantizes the output from the circuit 774 by making use of the quantization step size determined by the quantized value setting circuit 777. The de-DCT circuit 778 de-discrete-transforms the output from the de-quantizing circuit 776.

If the macroblock has been in-frame encoded (INTRA), the output from the de-DCT circuit 778 is passed through the calculation circuit 780 and supplied to the frame memory 782 to be written sequentially to the storage region for the present frame.

If the macroblock has been inter-frame decoded (INTER), the output from the de-DCT circuit 778 is difference data between the frames, and the calculation circuit 780 connects the switches 780a and 780b to the contact b in accordance with INTER/INTRA identification signal supplied from the MBH deciphering circuit 772. As a result, adder 780c adds image data for the previous frame supplied from the previous frame region of the frame memory 782 to the difference data transmitted from the de-DCT circuit 778.

In the MC (movement compensation) mode, the memory control circuit 784, in accordance with motion vector information supplied from the MBH deciphering circuit 772, reads image data for the previous frame from a position shifted in a quantity corresponding to the motion vector quantity to supply image data to the adder 780c by way of the filter 786. In the MC mode, it turns on/off the filter 786 in accordance with MTYPE information.

During the period in which decoded image data is written to the present frame storage region of the frame memory 782, the all INTRA detection circuit 650, in accordance with the frame No. and INTER/INTRA information, examines whether or not the overall portion of one image plane (one frame) is INTRA mode. If the one image plane is in the INTRA mode, the all INTRA detection circuit 650 opens the gate circuit 652 and permits supply of image data from the frame memory 782 to the image input/output circuit 618. As a result, an image, the one image plane that has been completely restored, is first displayed on the image display unit 616.

A frame (an image plane), a portion of which is, if any, inter-frame encoded (INTER), cannot be restored correctly without adequate data about the previous frame. Therefore, a disordered image is displayed if the frame is displayed as it is. However, this embodiment is arranged in such a manner that the image, the one image plane of which is fully INTRA mode, that is, the image which can be completely restored from only the image plane, is displayed. Therefore, a disordered image cannot be displayed.

Figure 22:
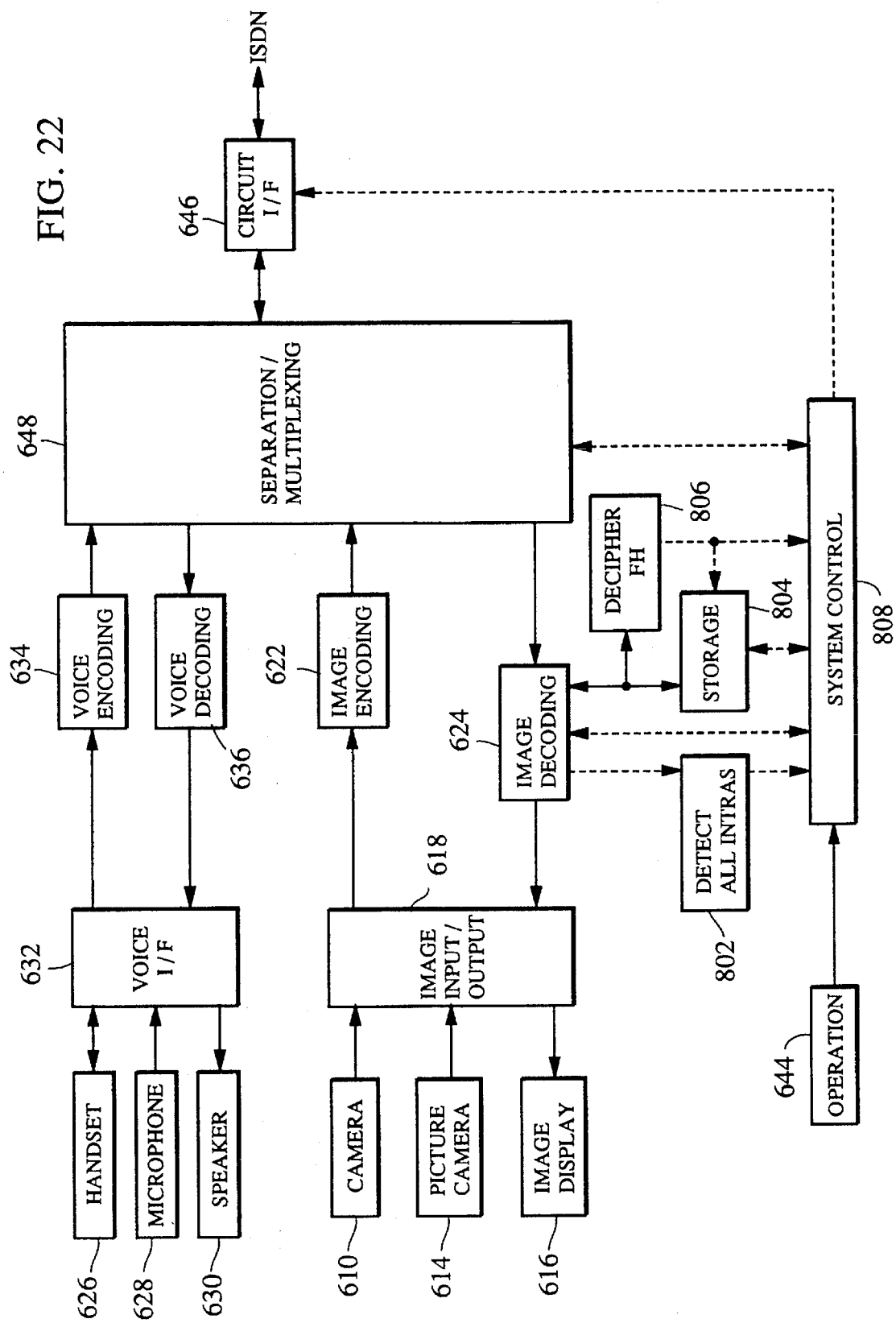
FIG. 22 is a schematic block diagram of a modified TV telephone according to the second embodiment.
Figure 23:
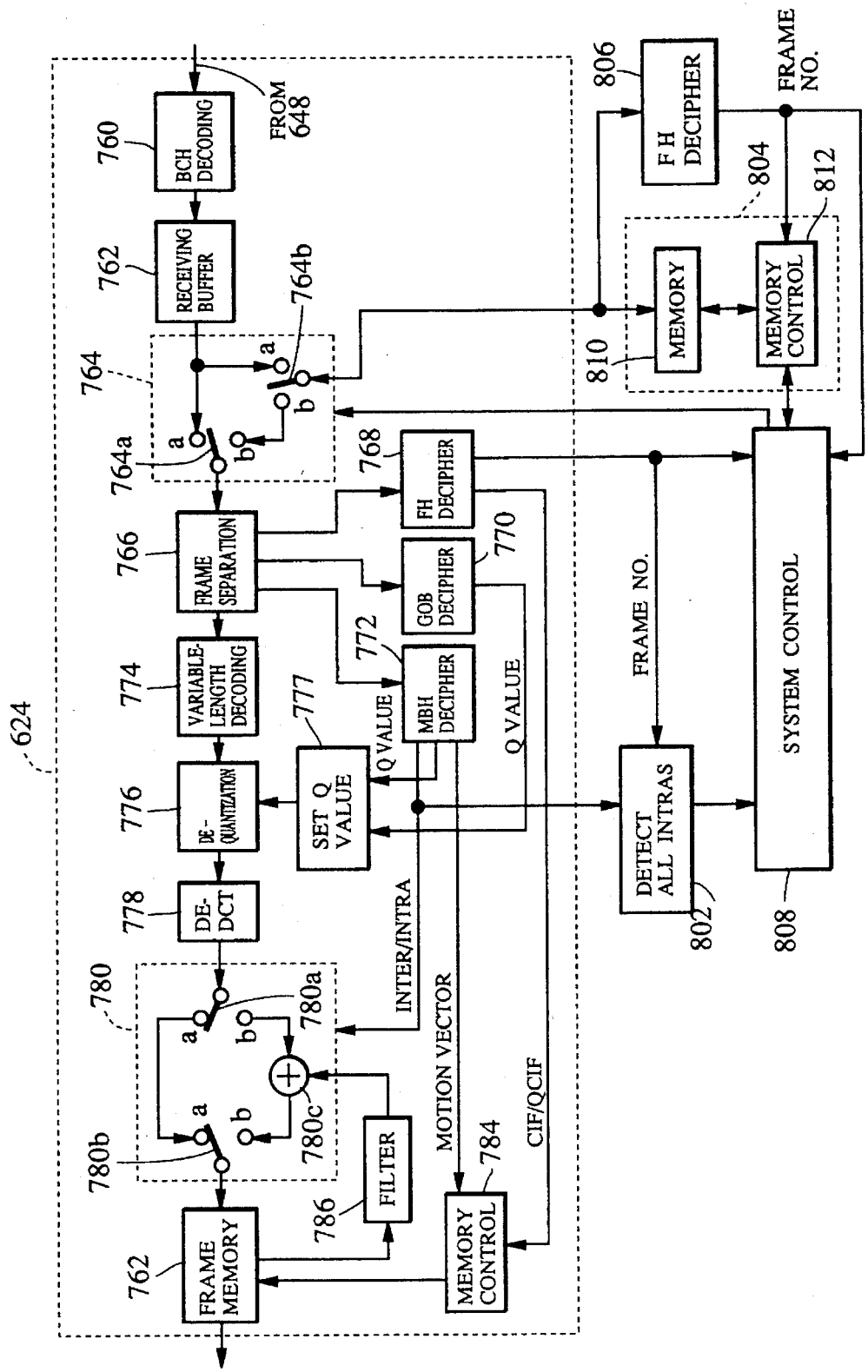
FIG. 23 is a schematic block diagram of a characteristic portion of the apparatus illustrated in FIG. 22.

FIG. 22 is a block diagram which illustrates the schematic structure of another embodiment of the present invention. FIG. 23 is a block diagram which illustrates the schematic structure of an essential portion of this embodiment. FIG. 23 corresponds to FIG. 21. The same elements as those shown in FIGS. 12 and 21 are given the same reference numerals.

Referring to FIG. 22, reference numeral 802 represents an all INTRA detection circuit, 804 represents a storage unit for keeping information, 806 represents a FH deciphering circuit for deciphering the frame header at the time of keeping a message, and 808 represents a system control circuit for controlling the overall operations of the system. As shown in FIG. 23, the storage unit 804 comprises a memory 810 and a memory control circuit 812 for controlling reading/writing to and from the memory 810 in accordance with the result of decipher (in particular, the frame No.) made by the FH deciphering circuit 806 and an instruction issued from the system control circuit 808.

Although the embodiments shown in FIGS. 12 and 21 are arranged in such a manner that received image information is kept in the storage unit in the image data multiplexed frame structure as it is, the embodiment shown in FIGS. 22 and 23 are arranged in such a manner that received image information is, in frame units from which the frame header is removed, stored. As the storage medium of the memory 810, a fixed memory, a magnetic disk, an optical disk, or an optomagnetic disk can be used similarly to the memory 788.

The operation to be performed at the time of the absence mode (the information keeping mode) will now be described. If a call is detected in the absence mode, the call is connected as described above. The BCH decoding circuit 760 decodes the BCH frame shown in FIG. 18 and transmits received data in the image data multiplexed frame structure shown in FIG. 19. The output is supplied to the switch circuit 764 by way of the receiving buffer 762. The system control circuit 808, in accordance with the connection of the call, connects the switches 764a and 764b of the switch circuit 764 to the contact a. As a result, received data in the image data multiplexed frame structure shown in FIG. 19 is supplied to the image frame separation circuit 766 by way of the switch 764a and to storage unit 804 and the FH deciphering circuit 806 by way of the switch 764b.

The FH deciphering circuit 806, similarly to the FH deciphering circuit 768, deciphers the frame header and sends the leading portion of the frame to the memory control circuit 812. Further, the FH deciphering circuit 806 supplies frame No. information to the system control circuit 808 and the memory control circuit 812. The memory control circuit 812 writes received data supplied through the switch 764b to the memory 810 in response to the leading portion of the frame. The system control circuit 808 links image information which is being stored in the memory 810 and the frame No. supplied from the FH deciphering circuit 806 with each other and stores linked information.

As described above, the system control circuit 808 stores the frame No. and storage position information while linking them and while storing received data in frame units into the memory 810.

The image frame separation circuit 766 separates header information to supply separated header information to the deciphering circuits 768, 770 and 772. Since this embodiment must simply detect the frame, the one frame of which is fully in-frame encoded, the necessity of operating the circuit 774 and the ensuing circuits can be eliminated.

The deciphering circuits 768, 770 and 772 decipher header information as described above. The FH deciphering circuit 768 supplies frame No. information to the all INTRA detection circuit 802 and the system control circuit 808. The MBH deciphering circuit 772 supplies INTER/INTRA identification information to the all INTRA detection circuit 802. The all INTRA detection circuit 802 examines whether or not all of the one frame has been in-frame encoded in accordance with frame No. information and INTER/INTRA identification information. If the all INTRA detection circuit 802 has detected the frame, the one frame of which has been in-frame encoded, it sends the frame No. to the system control circuit 808.

The system control circuit 808 retroactively examines the frame No. which coincides with the frame No. sent by the all INTRA detection circuit 802 among the frame Nos. of received data stored in the storage unit 804. All information stored previously to information about the coincident frame No. are deleted from the memory 810. Since it has been confirmed that received data stored in the storage unit 804 as described above has a first frame which is all INTRA compressed image data, it may be sequentially read to the decoding circuit 624 to be decoded and the image may be displayed on the image display unit 616.

Since the second embodiment described with reference to FIG. 12 and following drawings is arranged in such a manner that data received at the absence mode is stored while maintaining the compressed state, an excellent reproduced image quality can be obtained. Since the data is compressed, an image covering a relatively long time can be recorded to the storage units 654 and 804. Since an analog recording/reproducing unit, such as a VTR, can be omitted, the size of the apparatus can be reduced.

Since the image fully in-frame encoded is first reproduced and transmitted, no disordered image is displayed at the time of the commencement of the reproduction. Since data received after the image which has been fully in-frame encoded is stored in the storage unit, the storage capacity can effectively be used.

According to the second embodiment of the present invention, the image received during an absence can be recorded and reproduced as desired. Since the image, the frame of which has been fully in-frame encoded, is first reproduced and transmitted, the display of a disordered image at the time of the commencement of the reproduction can be prevented. Since the received image information is recorded in the compressed state, it can be stored in the storage unit for a long time.

The TV telephone apparatuses according to the first and second embodiments are respectively provided with the image display units 219 and 616 for displaying the received images.

The image display unit usually has peculiar light emitting characteristics and causes the color of the image to be displayed correctly by subjecting the image signal to a gamma correction process to make coincide it with the peculiar light emitting characteristics.

That is, the level of the image signal is low in a dark portion, while the level is high in a bright portion. The brightness (optical power) depends upon the spectrum characteristics of the photosensitive material of the imaging unit, those of the luminescence material of the image display unit (usually it is a color CRT) and those of the eyes. Therefore, the respective input and output characteristics are formed into non-linear shapes that can be mathematically expressed by power functions.

Figure 24:
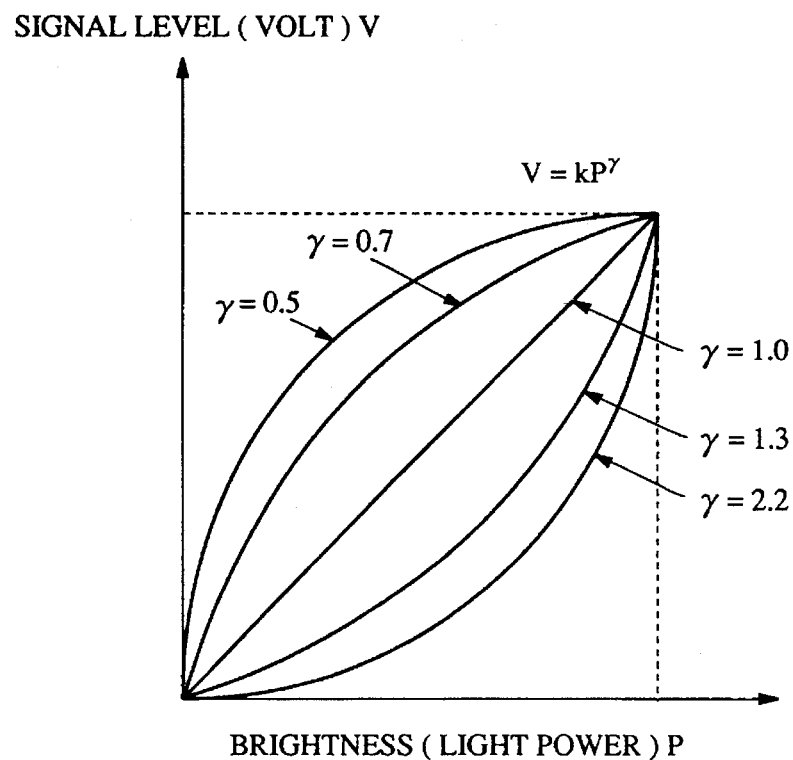
FIG. 24 shows γ-correction characteristic curves.

For example, a CRT receiver has light emitting characteristics that the light emission brightness of the fluorescent surface is in proportion to $\gamma$-th power of the video signal to be supplied to the receiving tube, that is, $\gamma$-characteristics. In the NTSC method, $\gamma$ is about 2.2. Therefore, the drive circuit for the receiver tube is provided with a $\gamma$-correction circuit that raises the input voltage to the $1/\gamma$-th power to set off or compensate the $\gamma$-characteristics of the receiver tube. From an economical viewpoint, the correction circuit is provided for the camera in place of providing the $\gamma$-correction circuits for all of the receiver tubes. FIG. 24 shows the $\gamma$-correction characteristics.

Although it is preferable that the total $\gamma$ be 1 in terms of directly reading the intensity of light at the time of measuring an image, a dark portion cannot easily be recognized in this case. Therefore, $\gamma$ is usually set to 0.5 to 0.7. In the case of a white and black film, negative film has $\gamma=0.65$, the positive film has $\gamma=2.25$, and therefore the total $\gamma$-characteristics of $\gamma=1.46$ is attained. If the total $\gamma$-value is 1 or less, the image tone is softened. If the total $\gamma$-value is 1 or more, the image tone is hardened.

In the case of a white and black picture, the total $\gamma$-value is made to be 1.46, with which a relatively sharp image is formed. The reason for this is that the contrast is raised by raising the thickness to compensate for the colorless image.

The $\gamma$-correction acts to prevent a deformation of a portion of an image occurring in a case where the dynamic range of the brightness is wide.

Recently, image display apparatuses, such as the liquid crystal display apparatus and the plasma display apparatus, that are different from the CRT have been developed and used. The foregoing display apparatuses respectively have different γ-values from that of the CRT or the γ-correction can be omitted. If the γ-value is different as in the foregoing case, an independent γ-correction circuit must be provided for the display unit. If the γ-correction can be omitted, a γ-correction circuit for setting off the γ-correction to be performed in the camera must be provided.

The CRT adapted to the NTSC method has a γ-value of about 2.2, that adapted the PAL method has a similar value, and the CRT adapted to the SECAM method has a γ-value of 2.8. Therefore, the PAL method is so arranged that a γ-correction of 1/2.2 is performed in the camera, and the SECAM method is so arranged that a γ-correction of 1/2.8 is performed in the camera. If the TV telephone communication or a TV conference is held between the SECAM method area and the NTSC or PAL method area, the total γ-value cannot be made to be 1, causing an image to be displayed the quality of which is unsatisfactory.

Although the standard γ-value of a color receiver tube in the NTSC region is 2.2, the dispersion of the type of the receiving tube and the drive method sometimes causes the value to be 3 to 5.

The γ-correction performed in the camera raises problems that the constant-brightness principle cannot be held, the detail deteriorates, a floating phenomenon occurs and saturation deteriorates as disclosed in detail in "Multi-Dimensional Signal Process of TV image" Nikkan Kogyo Shinbun, Fukinuki Yoshihiko, pp 56 et seq.

As described above, present image communication systems encounter a problem because the γ-correction performed in the camera, that is, the image transmission side, does not coincide with the γ-characteristics of the image receiver side. The foregoing nonconformity causes the image to be reproduced incorrectly.

However, the γ-correction of the foregoing image communication system is not adapted to the CCITT recommendation. Therefore, whether or not the γ-correction is performed and the correction value at the time of the correction are determined by the image transmission side, while the image receiving side cannot know whether or not the γ-correction of the received image is performed and the degree of the correction. On the contrary, the image transmission side cannot know the light emission characteristics of the image display unit on the receiving side. Therefore, a γ-correction is performed by using a γ-correction value adapted to the light emission characteristics of the image display unit of the transmission side or a standard image discharge unit before the transmission of the image.

In the foregoing state, an image is displayed by the image display unit of the image receiver side in a color which is different from the color which is intended to be displayed by the image transmission side. Therefore, a problem of unsatisfactory color reproducibility arises.

An object of a third embodiment of the present invention is to provide an image transmission system and an image receiving unit capable of overcoming the foregoing problem.

The third embodiment will now be described with reference to the drawings.

Figure 25:
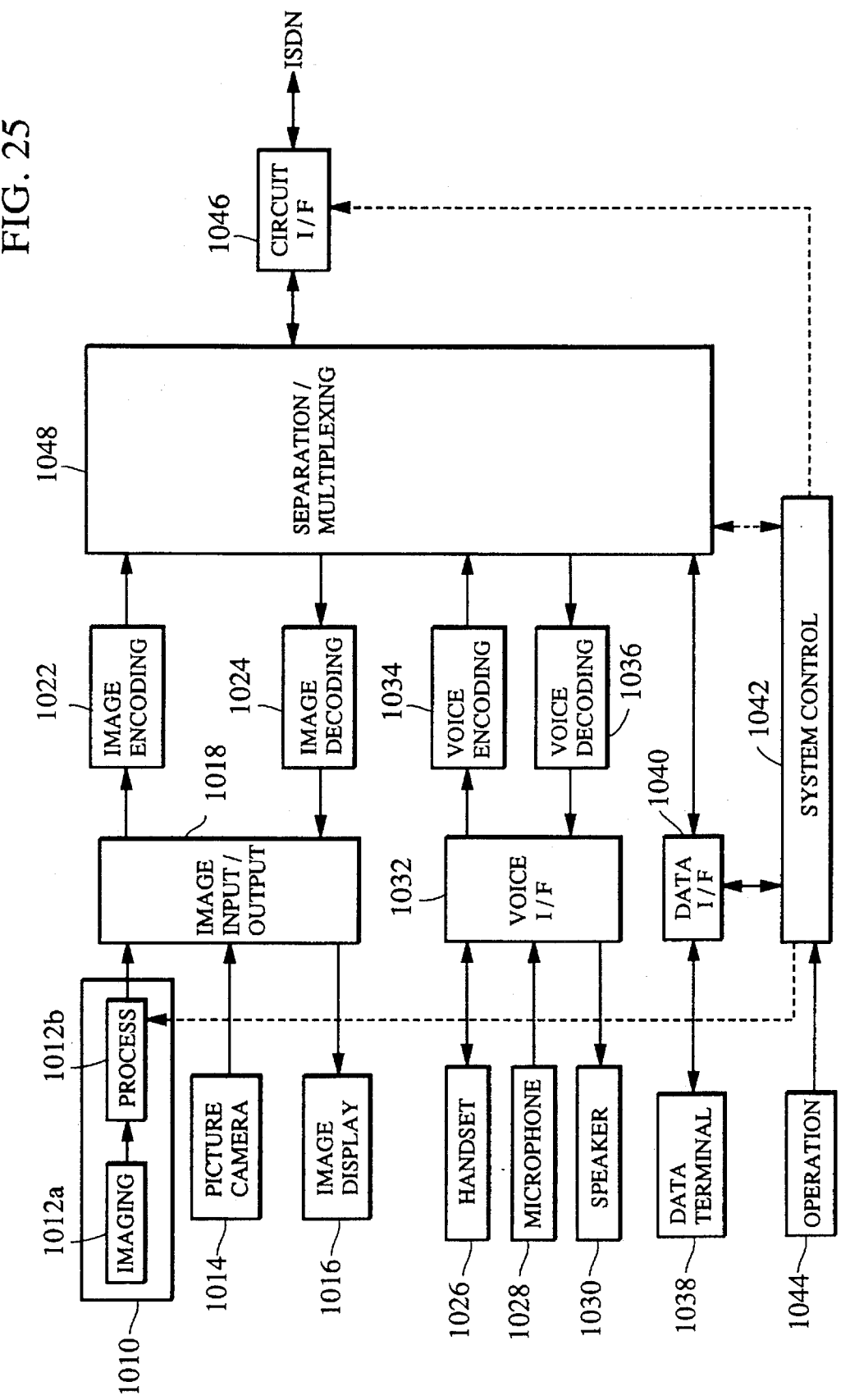
FIG. 25 is a schematic block diagram of a third embodiment of the TV telephone apparatus of the present invention.

FIG. 25 is a block diagram which illustrates the schematic structure of a terminal unit according to the third embodiment of the present invention.

Referring to FIG. 25, reference numeral 1010 represents a camera for photographing attendants of a meeting, the camera 1010 comprising an imaging unit 1012a and a processing circuit 1012b for subjecting the output from the imaging unit 1012a to a camera signal processes, such as a white balance adjustment process and a γ-correction process. In this embodiment, whether or not the γ-correction is performed with the processing circuit 1012b and the degree (the γ-value) of the correction can be controlled from outside.

Reference numeral 1014 represents a picture writing camera for photographing a meeting document, such as a drawing, 1016 represents an image display unit comprising a CRT or a liquid crystal display unit, and 1018 represents an image input/output circuit that selects an output image from the camera 1010 or 1014 to be transmitted and selects/outputs the image transmitted from the camera 1010 or 1014 to select or synthesize them to supply the selected or the synthesized image to the image display unit 1016.

Reference numeral 1022 represents an image encoding circuit for encoding an image signal to be transmitted, and 1024 represents an image decoding circuit for decoding the received encoded image signal.

Reference numeral 1026 represents a handset comprising a microphone and a speaker, 1028 represents a microphone, 1030 represents a speaker, 1032 represents a voice input/output interface adapted to the handset 1026, the microphone 1028 and the speaker 1030. The voice input/output interface 1032 performs an echo cancellation process and a process for generating a dial tone, a call tone, busy tone and receipt tone as well as changes over the voice input and output of the handset 1026, the microphone 1028 and the speaker 1030.

Reference numeral 1034 represents a voice encoding circuit for encoding a voice signal to be transmitted, the voice signal being supplied through the voice input/output interface 1032. Reference numeral 1036 represents a voice decoding circuit for decoding the received encoded voice signal to the voice input/output interface 1032.

Reference numeral 1038 represents a data terminal unit such as a personal computer, and 1040 represents a data interface for connecting the foregoing data terminal unit 1038.

Reference numeral 1042 represents a system control circuit for controlling the overall system, and 1044 represents a control unit for inputting various instructions to the system control circuit 1042, the control unit comprising, for example, a keyboard, a touch panel, a digitizer, or a pointing device such as a mouse.

Reference numeral 1046 represents a circuit interface of a communication line (for example, the ISDN circuit). Reference numeral 1048 represents a separation/multiplexing circuit that multiplexes information supplied from the image encoding circuit 1022 and the voice encoding circuit 1034 and the data interface 1040 to be transmitted and control information supplied from the system control circuit 1042 into a H.221 format to supply them to the circuit interface 1046. Further, the separation/multiplexing circuit 1048 separates image, voice and control signals from information supplied from the circuit interface 1046 to supply the signals to the image decoding circuit 1024, the voice decoding circuit 1036 and the system control circuit 1042, respectively.

The flow of the image signal and the voice signal realized in the embodiment shown in FIG. 25 will now be described briefly. An image inputted through the camera 1010 or the picture writing camera 1014 is selected by the image input/output circuit 1018 to be supplied to the image encoding circuit 1022. The image encoding circuit 1022 encodes the supplied image signal in accordance with an encoding mode in response to a control signal supplied from the system control circuit 1042 or in accordance with the internal decision to transmit the encoded signal to the separation/multiplexing circuit 1048.

On the other hand, the voice signal inputted through the microphone of the handset 1026 or the microphone 1028 is received by the voice encoding circuit 1034 by way of the voice input/output interface 1032 to be encoded before the encoded signal is supplied to the separation/multiplexing circuit 1048.

Data to be transmitted from the data terminal 1038 is received by the separation/multiplexing circuit 1048 by way of the data interface 1040. Also data to be transmitted and supplied from the control unit 1044 is received by the separation/multiplexing circuit 1048 by way of the data interface 1040.

The separation/multiplexing circuit 1048 multiplexes encoded signals supplied from the image encoding circuit 1022 and the voice encoding circuit 1034, data supplied through the data interface 1040 and a control command issued by the system control circuit 1042 and transmits the multiplexed signal to the circuit interface 1046. The circuit interface 1046 transmits the signal supplied from the separation/multiplexing circuit 1048 to the connected communication line while forming the signal into a predetermined format.

The signal supplied through the communication line is supplied to the separation/multiplexing circuit 1048 by way of the circuit interface 1046. The separation/multiplexing circuit 1048 separates the encoded image signal, the encoded voice signal data and the control command from the supplied signal and supplies them to the image decoding circuit 1024, the voice decoding circuit 1036, the data interface 1040 and the system control circuit 1042, respectively.

The image decoding circuit 1024 decodes the encoded image signal supplied from the separation/multiplexing circuit 1048 to supply the decoded signal to the image input/output circuit 1018. The image input/output circuit 1018 selects or synthesizes the images supplied from the cameras 1010, 1014 and the image supplied from the image decoding circuit 1024 to supply the result to the image display unit 1016. The image input/output circuit 1010 performs, as the synthesis process, a picture-in-picture process and a process of fitting the image to a corresponding window in a window display system. As a result, the supplied image and/or the received image is displayed on the image plane of the image display unit 1016.

The received voice signal decoded by the voice encoding circuit 1036 is supplied to the speaker of the handset 1026 and/or the speaker 1030 by way of the voice input/output interface 1032. As a result, the voice of the other side can be heard.

Received data separated by the separation/multiplexing circuit 1048 is supplied to the data terminal 1038 through the data interface 1040.

Since the method of determining the converting ability of the terminal through the ISDN line is the same as that according to the embodiment shown in FIG. 12, its detailed description is omitted here.

Figure 26:
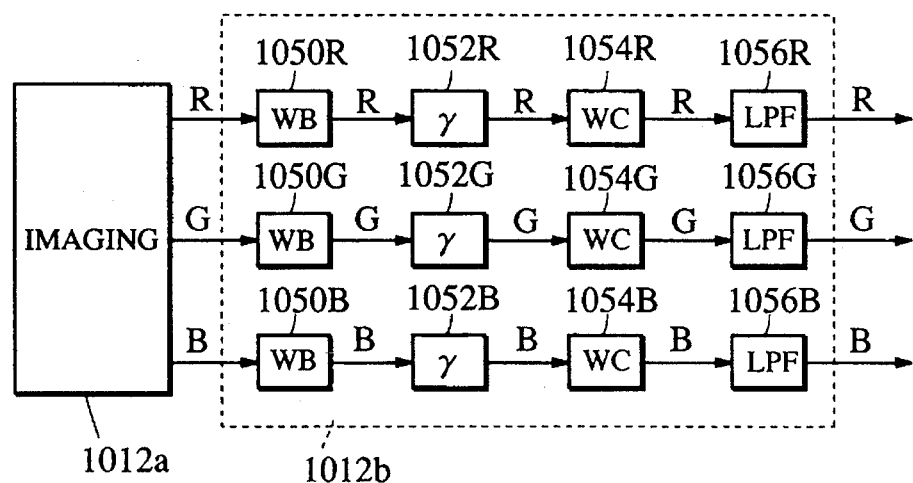
FIG. 26 is a detailed circuitry block diagram of the process circuit 1012b shown in FIG. 25.

FIG. 26 illustrates the internal structure of the process circuit 1012*b*. In order to simplify the description, an imaging unit 1010*a* transmits color pixel signals R (red), G (green) and B (blue) in parallel. The process circuit 1012*b* includes: white balance adjustment circuits 1050R, 1050G and 1050B for adjusting the R, G and B values of the R, G and B signals in accordance with the color temperature of the light source; γ-correction circuits 1052R, 1052G and 1052B for raising output signals from the white balance adjustment circuits 1050R, 1050G and 1050B to the 1/γ-th power and transmitting the results; white clip circuits 1054R, 1054G and 1054B for adjusting the maximum value of the white level; and low-pass filters (LPFs) 1056R, 1056G and 1056B for limiting the band.

Since the functions of the white balance adjustment circuits 1050R, 1050G and 1050B and the white clip circuits 1054R, 1054G and 1054B are known, their descriptions are omitted.

The reason why the γ-correction circuits 1052R, 1052G and 1052B are provided will now be described.

Since various image display units having different γ-characteristics can be used on the image receiver side, the γ-correction of the standard γ-characteristics performed uniformly on the image transmission side is insufficient to maintain the total γ-value at a desired value (for example 1), resulting in a necessity of performing additional γ-correction.

Therefore, this embodiment is arranged in such a manner that the γ-value of each of the γ-correction circuits 1052R, 1052G and 1052B in the processing circuit 1012*b* on the image transmission side can be selected to perform the γ-correction with a γ-value needed by the image receiver side. In the γ-correction, γ=1, of course, means exclusion of the γ-correction.

The γ-value of the γ-correction needed by the image receiver side is sent to the image transmission side by utilizing the BAS of the in-channel control of the channel B as shown in FIG. 14. For the attribute value shown in FIG. 17(*b*), the undefined or an escape code is used. The image transmission side notifies the image receiver side of the upper and lower limits of the γ-correction ability of the image transmission side in the format shown in FIG. 27(*a*). The image receiver side, in the format shown in FIG. 27(*b*), notifies the upper and lower limits of the γ-correction value that must be possessed by the image transmission side.

In FIG. 27(*a*), the identifier is code information indicating an individual mode. A γ-correction identifier is code information indicating data about the γ-correction. The fact whether or not the γ-correction is present indicates whether or not the γ-correction can be made invalid by the image transmission side, that is, whether or not it can be bypassed. The γ-correction value (the upper limit) and the γ-correction value (the lower limit) indicate the selectable γ-correction value range.

In FIG. 27 (*b*), the identifier is code information indicating an individual mode and the γ-correction identifier is code information indicating data about the γ-correction similar to those shown in FIG. 27(*a*). The fact whether or not the γ-correction is present indicates whether or not the γ-correction is needed on the image transmission side. The γ-correction value (the upper limit) and the γ-correction value (the lower limit) indicate the γ-correction value range that can be acceptable for the image receiving side.

When the image receiver side notifies the image transmission side that no γ-correction is needed, the image transmission side makes the γ-value of each of the γ-correction circuits 1052R, 1052G and 1052B to be 1 and transmits a video signal that is substantially free from the γ-correction. If the image receiver side requires the image transmission side to perform the γ-correction process and if the γ-correction value is adaptable for the image transmission side, the image transmission side transmits the video signal which has been γ-corrected with the required γ-correction value. If the image transmission side cannot use the γ-correction value needed by the image receiver side, the γ-correction is performed with the approximated γ-correction value to transmit the video signal.

Figures 27A, 27B, 28:
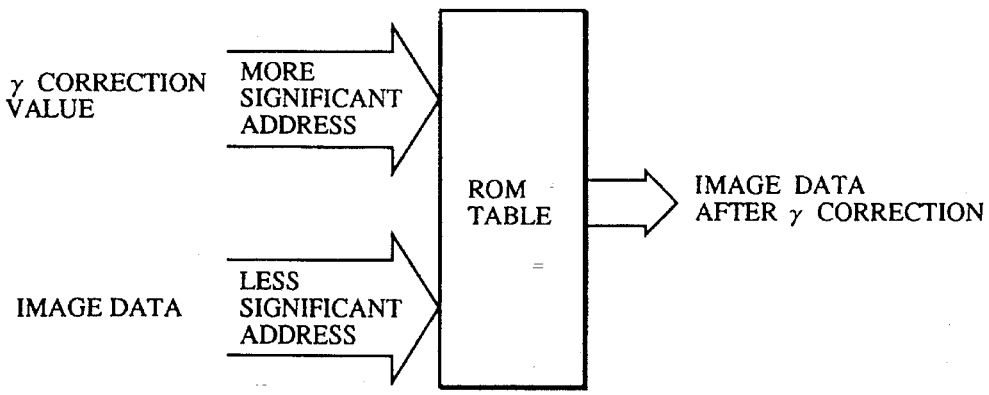
FIGS. 27(a) and 27(b) illustrate a format for transmitting and receiving γ-correction control information.
FIG. 28 illustrates an example of the γ-correction circuits 1052R, 1052G and 1052B.

An example of a circuit practicing the γ-correction circuits 1052R, 1052G and 1052B by digital circuits is shown in FIG. 28. When the γ-correction value is allocated to the upper address and the video data to be γ-corrected is allocated to the lower address, the γ-corrected video data is stored at the corresponding positions in the ROM.

Although an analog method, such as a method of approximating the non-linear characteristics by a line graph or a method using the non-linear characteristics of the diode, is available, the foregoing methods suffers from a disadvantage occurring when it encounters scattering of parts and temperature change.

Although the description has been made about the image communication system, such a the TV telephone system, for transmitting the image in the two directions, the present invention may, of course, be adapted to a system in which the image is always transmitted in one direction. The present invention can be adapted to a building monitoring system for monitoring the inside portion of the building by making use of a plurality of TV cameras for example. Further, an adjustment for improving the color reproducibility can be performed on the image receiving side.

As for use of measured data, image information free from the γ-correction can be obtained if necessary, providing users an advantage of convenience.

As can easily be understood from the foregoing description, the present invention operates whether or not the γ-correction is performed and the degree of the γ-correction can be controlled from the image transmission side to be adaptable to the image receiver side. Therefore, the color reproducibility and the image quality can be improved.

Although the invention has been described in its preferred form with a certain degree of particularity, it is understood that the present disclosure of the preferred form may be changed in the details of construction and in the combination and arrangement of parts without departing from the spirit and the scope of the invention as hereinafter claimed.

What is claimed is:

1. A television telephone apparatus, comprising:

response message transmitting means for automatically commencing a response communication to a partner communication apparatus in response to a call received from the partner communication apparatus to send a response message from said television telephone apparatus to the partner communication apparatus;

storage means for storing an image message transmitted from the partner communication apparatus in response to the response communication transmitted from the television telephone apparatus to the partner communication apparatus by said response message transmitting means; and request signal transmitting means for transmitting to the partner communication apparatus an image frame update request signal to identify an encoding mode used for encoding the image message;

wherein said storage means stores the image message from the partner communication apparatus when the encoding mode, identified by the partner communication apparatus after transmission of the image frame update request signal by said request signal transmitting means, is identified as being a predetermined mode.

2. A television telephone apparatus according to claim 1, wherein the encoding mode comprises a first encoding mode in which encoding is conducted on the basis of a difference between frames and a second encoding mode in which encoding is conducted on the basis of intra-frame data.

3. A television telephone apparatus according to claim 2, wherein said request signal transmitting means requests the partner communication apparatus to update the encoding mode to said second encoding mode.

4. A television telephone apparatus according to claim 1, wherein said storage means stores a voice message transmitted from the partner communication apparatus.

5. A television telephone apparatus according to claim 4, further comprising communication time administration means for determining when a time of recording of the voice message in said storage means exceeds a predetermined time.

6. A television telephone apparatus according to claim 5, further comprising transmitting means for transmitting a predetermined image message back to the partner communication apparatus when said communication time administration means has determined that the time of storage of the voice message has exceeded said predetermined time.

7. A television telephone apparatus, comprising:

response message transmitting means for automatically commencing a response communication to a partner communication apparatus in response to a call received from the partner communication apparatus, and for transmitting a response message to the partner communication apparatus;

storage means for storing an image message data and voice message data transmitted from the partner communication apparatus in response to the response communication transmitted from said television telephone apparatus to the partner communication apparatus by the response message transmitting means;

request signal transmitting means for transmitting to the partner communication apparatus an image frame update request signal to identify an encoding mode used for encoding the image message;

wherein said storage means stores the image message from the partner communication apparatus when the encoding mode, identified by the partner communication apparatus after transmission of the image frame update request signal by said request signal transmitting means, is identified as being a predetermined mode;

communication time administration means for administrating the time for storage of the voice message data sent from the partner communication apparatus; and image message transmitting means for transmitting to the partner communication apparatus an image message in response to a signal from said communication time administration means.

8. A television telephone apparatus according to claim 7, wherein said image message transmitting means transmits to the partner communication apparatus an image message indicating expiration of a predetermined time for storage of the voice message data when said communication administration means determines that the time for storage of the voice message data exceeds the predetermined time.

9. A television telephone apparatus having an automatic transmission function for automatically commencing a response communication to a partner communication apparatus in response to a call received from the partner communication apparatus to transmit an encoded image message, said television telephone apparatus comprising:

a first memory for storing, on a frame basis, an image message to be transmitted to a partner communication apparatus;

a second memory for storing preset still image message data;

writing means for writing, in an automatic transmitting mode of said apparatus, the preset still image message data stored in said second memory into said first memory; and transmitting means for transmitting the still image message data written in said first memory from said second memory by said writing means as a response communication to the partner communication apparatus.

10. An image receiving apparatus for use in an image communication system which transmits and receives image information after compression using an intra-frame encoding mode and an inter-frame encoding mode, said apparatus comprising:

storage means for storing compressed image data received from a partner communication apparatus;

reading means for reading compressed image data from said storage means;

decoding means for decoding the compressed image data read from said storage means by said reading means and producing a restored image signal;

detecting means for detecting, within the compressed image data read from said storage means, a frame in which the compressed image data has been fully intra-encoded; and control means for controlling an output reproduced from the restored image signal produced by said decoding means in accordance with a detection output of said detecting means.

11. An image receiving apparatus for use in an image communication system which transmits and receives image information after compression using an intra-frame encoding mode and an inter-frame encoding mode, said apparatus comprising:

storage means for storing compressed image data received from a partner communication apparatus;

detecting means for detecting, within the received image data, a frame in which the compressed image data has been fully intra-encoded; and control means for deleting, in accordance with an output of said detecting means, image data received before the frame of the received image data in which the compressed image data has been fully intra-encoded as detected by said detecting means.

12. An image transmitting apparatus, comprising:

$\gamma$ correction means for effecting $\gamma$ correction of an image;

transmitting means for transmitting an image output from said $\gamma$ correction means to a partner communication apparatus;

control information receiving means for receiving $\gamma$ correction control information from the partner communication apparatus, the correction control information including information on the amount of $\gamma$ correction required to be performed by said image transmitting apparatus; and control means for controlling said $\gamma$ correction means in accordance with the $\gamma$ correction control information received by said control information receiving means.

13. A television telephone apparatus according to claim 1, further comprising:

an image encoding means for encoding the response communication in one of a plurality of encoding modes.

14. A television telephone apparatus according to claim 1, further comprising:

storage means for storing a voice message transmitted from the partner communication apparatus, said storage means storing the voice message to correspond to the image message from the received call.

15. A television telephone apparatus according to claim 9, further comprising:

storage means for storing compressed image data received from the partner communication apparatus;

a decoding means for decoding the compressed image data read from said storage means to produce a restored image signal; and display means for displaying an image corresponding to the restored image signal from said decoding means.

16. A television telephone apparatus according to claim 9, further comprising:

storage means for storing voice message data transmitted from the partner communication apparatus, said storage means storing the voice message data to correspond to image data from the received call.

17. A television telephone apparatus according to claim 15, further comprising:

communication time administration means for timing the voice message data received from the partner communication apparatus; and an image message transmitting means for transmitting an image message to the partner communication apparatus when said communication time administration means determines that the time for storage of the received voice message data exceeds a predetermined time.

* * * * *

UNITED STATES PATENT AND TRADEMARK OFFICE
CERTIFICATE OF CORRECTION

PATENT NO. : 5,473,366

DATED : December 5, 1995

INVENTOR(S) : EIJI IMAEDA, et al.

It is certified that error appears in the above-indentified patent and that said Letters Patent is hereby corrected as shown below:

ON THE TITLE PAGE:

[56] References Cited

FOREIGN PATENT DOCUMENTS

```
   "0196759    8/1991    Japan
    0178247    8/1991    Japan
  403258087   11/1991    Japan
    0250889   11/1991    Japan
  405014882    1/1993    Japan"  should read
  --3-196759   8/1991    Japan
    3-178247   8/1991    Japan
    3-258087  11/1991    Japan
    3-250889  11/1991    Japan
    5-14882    1/1993    Japan--.
```

[57] Abstract

Line 20, "γ" should read --g--.

IN THE DRAWINGS

Sheet 3

Figure 3, "INTRA IMAGE" should read --INTRA-IMAGE--.

UNITED STATES PATENT AND TRADEMARK OFFICE
CERTIFICATE OF CORRECTION

PATENT NO. : 5,473,366        Page 2 of 4
DATED : December 5, 1995
INVENTOR(S) : EIJI IMAEDA, et al.

It is certified that error appears in the above-indentified patent and that said Letters Patent is hereby corrected as shown below:

IN THE DRAWINGS (continued)

Sheet 10

Figure 11, "INTER FRAME" should read --INTER-FRAME--.

Sheet 17

Figure 18, "FIL E" should read --FILE--.

COLUMN 1

Line 16, "widespread" should read --widespread,--.

COLUMN 3

Line 34, "storage-means" should read --storage means--.

COLUMN 5

Line 42, "207," should read --206,--.
Line 46, "206" should read --207,--.

UNITED STATES PATENT AND TRADEMARK OFFICE
CERTIFICATE OF CORRECTION

PATENT NO. : 5,473,366

DATED : December 5, 1995

INVENTOR(S) : EIJI IMAEDA, et al.

It is certified that error appears in the above-indentified patent and that said Letters Patent is hereby corrected as shown below:

COLUMN 7

Line 5, "a" should be deleted.

COLUMN 11

Line 26, "Cb" should read --Cb,--.
Line 56, "corresponding" should read --corresponding to--.

COLUMN 12

Line 25, "a" should be deleted.

COLUMN 16

Line 14, "a" should be deleted.
Line 22, "uses" should read --use--; and "continuous a" should read --a continuous--. COLUMN 22

Column 22

Line 26, "coincide it" should read --it coincide--.

COLUMN 23

Line 2, "y-correction" should read --r-correction--.
Line 18, "displayed" should read --displayed,--.
Line 27, "image" should read --Image--.

UNITED STATES PATENT AND TRADEMARK OFFICE
CERTIFICATE OF CORRECTION

PATENT NO. : 5,473,366    Page 4 of 4
DATED : December 5, 1995
INVENTOR(S) :
    EIJI IMAEDA, et al.

It is certified that error appears in the above-indentified patent and that said Letters Patent is hereby corrected as shown below:

COLUMN 27

Line 9, "methods" should read --method--.
    Line 13, "a" should read --as--.

COLUMN 29

Line 39, "deleting," should read --detecting,--.

COLUMN 30

Line 35, "to" (second occurrence) should read --to the--.

Signed and Sealed this

Eleventh Day of June, 1996

Attest:

BRUCE LEHMAN

*Attesting Officer*    Commissioner of Patents and Trademarks